(12) United States Patent
Fukui et al.

(10) Patent No.: US 12,401,948 B2
(45) Date of Patent: Aug. 26, 2025

(54) SPEAKER SYSTEM

(71) Applicant: NIPPON TELEGRAPH AND TELEPHONE CORPORATION, Tokyo (JP)

(72) Inventors: Masahiro Fukui, Tokyo (JP); Kazunori Kobayashi, Tokyo (JP); Noriyoshi Kamado, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 285 days.

(21) Appl. No.: 18/031,331

(22) PCT Filed: Oct. 28, 2020

(86) PCT No.: PCT/JP2020/040454
§ 371 (c)(1),
(2) Date: Apr. 11, 2023

(87) PCT Pub. No.: WO2022/091256
PCT Pub. Date: May 5, 2022

(65) Prior Publication Data
US 2023/0379628 A1 Nov. 23, 2023

(51) Int. Cl.
*H04R 5/02* (2006.01)
*H04R 3/12* (2006.01)
*H04B 1/00* (2006.01)

(52) U.S. Cl.
CPC ............... *H04R 5/023* (2013.01); *H04R 3/12* (2013.01); *H04R 2205/024* (2013.01); *H04R 2499/13* (2013.01)

(58) Field of Classification Search
CPC .... H04R 5/023; H04R 3/12; H04R 2205/024; H04R 2499/13
(Continued)

(56) References Cited

U.S. PATENT DOCUMENTS 8,509,452 B2    8/2013  Yokota
2006/0056650 A1 3/2006  Hofmann et al.

FOREIGN PATENT DOCUMENTS

JP    H1161654 U    11/1989
JP    H08-033086 A   2/1996
(Continued)

OTHER PUBLICATIONS

Japan Airlines (2020) "Inflight Entertainment/JAL First Class" [online] Accessed on Mar. 10, 2020, website: <URL:https://www.jal.co.jp/jp/ja/inter/service/first/entertainment/index.html>.

*Primary Examiner* — Ammar T Hamid

(57) ABSTRACT

Two speaker units are arranged on the right side from the center of a seat; two speaker units are arranged on the left side from the center of the seat; one of the two speaker units arranged on the right side is arranged at a position closer to the right ear of a user seated on the seat as compared with the other one of the two speaker units arranged on the right side; one of the two speaker units arranged on the left side is arranged at a position closer to the left ear of the user seated on the seat as compared with the other one of the two speaker units arranged on the left side; acoustic signals obtained on the basis of a reproduction target are emitted from the two speaker units arranged on the right side to be opposite in phase to each other; the acoustic signals obtained on the basis of the reproduction target are emitted from the two speaker units arranged on the left side to be opposite in phase to each other; and the acoustic signals are emitted from two speaker units arranged on the positions closer to the ears not to be opposite in phase to each other.

4 Claims, 29 Drawing Sheets

(58) Field of Classification Search
USPC .................................................. 381/300, 86
See application file for complete search history.

(56) References Cited

FOREIGN PATENT DOCUMENTS

| | | | |
|---|---|---|---|
| JP | H08511151 A | | 11/1996 |
| JP | 2006508573 A | * | 3/2006 |
| JP | 2008271067 A | | 11/2008 |
| WO | 95/34184 A1 | | 12/1995 |

* cited by examiner

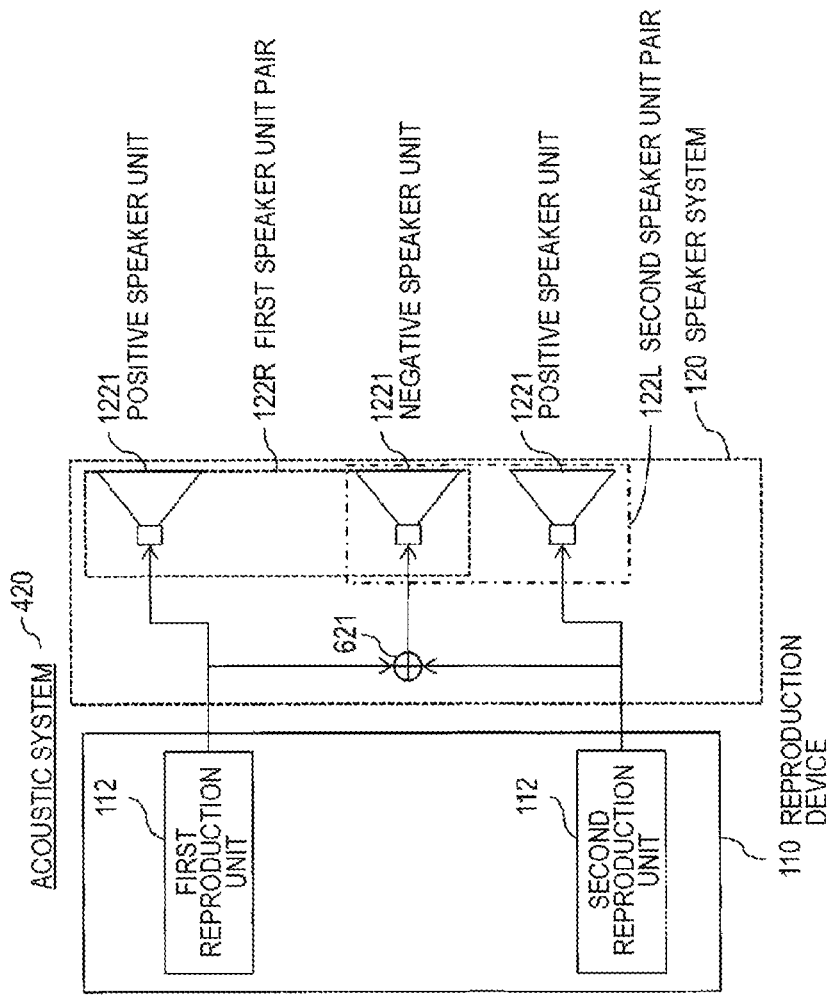

SPEAKER SYSTEM

CROSS-REFERENCE TO RELATED APPLICATIONS

This application is a U.S. National Stage Application filed under 35 U.S.C. § 371 claiming priority to International Patent Application No. PCT/JP2020/040454, filed on 28 Oct. 2020, the disclosure of which is hereby incorporated herein by reference in its entirety.

TECHNICAL FIELD

The present invention relates to a sound reproduction technology that can be used in an audio system installed in a seat of an aircraft, an automobile, or the like.

BACKGROUND ART

Conventionally, a user uses earphones or headphones to view and hear a movie or music in an aircraft (see Non Patent Literature 1). This is because if the speaker is used, a reproduced sound reaches a periphery of the user, which causes trouble to other users.

CITATION LIST

Non Patent Literature

Non Patent Literature 1: Inflight Entertainment/JAL First Class, [online], [searched on Mar. 10, 2020], Internet <URL:https://www.jal.co.jp/jp/ja/inter/service/first/enterta inment/index.html>

SUMMARY OF INVENTION

Technical Problem

However, wearing earphones and headphones is troublesome for the user. In addition, there are users who do not like wearing due to, for example, disturbance of hairstyle. Some users do not like pressure on their ears due to wearing. Further, wearing earphones or headphones for a long time may make the user feel tired of hearing.

To eliminate a need for wearing the earphones or headphones, it is conceivable to synthesize a virtual sound field using a wavefront synthesis technology, but in this case, it is necessary to prepare a large-scale speaker array, which is not realistic.

Thus, an object of the present invention is to provide a speaker system that reproduces a sound that cannot be heard by surrounding users without using earphones, headphones, or a large-scale speaker array.

Solution to Problem

In one aspect of the present invention, a speaker system emits, by using at least four speaker units arranged in a seat of a vehicle, acoustic signals obtained on the basis of a reproduction target such that the acoustic signals are not able to be heard or hardly heard outside a predetermined range near a user who uses the seat. At least two speaker units of the at least four speaker units are arranged on a right side from a center of the seat; at least two speaker units of the at least four speaker units are arranged on a left side from the center of the seat; a (2R-1)-th speaker unit that is one of the at least two speaker units arranged on the right side is arranged at a position closer to a right ear of the user seated on the seat as compared with a 2R-th speaker unit that is another one of the at least two speaker units arranged on the right side; and a (2L-1)-th speaker unit that is one of the at least two speaker units arranged on the left side is arranged at a position closer to a left ear of the user seated on the seat as compared with a 2L-th speaker unit that is another one of the at least two speaker units arranged on the left side. The acoustic signals obtained on the basis of the reproduction target are emitted from the (2R-1)-th speaker unit and the 2R-th speaker unit to be opposite in phase to each other; the acoustic signals obtained on the basis of the reproduction target are emitted from the (2L-1)-th speaker unit and the 2L-th speaker unit to be opposite in phase to each other; and the acoustic signals are emitted from the 2R-1 speaker unit and the 2L-1 speaker unit not to be opposite in phase to each other.

In one aspect of the present invention, a speaker system emits, by using at least four speaker units arranged in a seat of a vehicle, acoustic signals obtained on the basis of a reproduction target such that the acoustic signals are not able to be heard or hardly heard outside a predetermined range near a user who uses the seat. A (2R-1)-th speaker unit and a 2R-th speaker unit that are two speaker units of the at least four speaker units are arranged on a right side from a center of the seat, and a (2L-1)-th speaker unit and a 2L-th speaker unit that are two speaker units of the at least four speaker units are arranged on the right side from the center of the seat. The (2R-1)-th speaker unit emits a (2R-1)-th acoustic signal that is one of the acoustic signals obtained on the basis of the reproduction target; the 2R-th speaker unit emits a 2R-th acoustic signal that is an acoustic signal having a phase opposite to that of the (2R-1)-th acoustic signal; the (2L-1)-th speaker unit emits a (2L-1)-th acoustic signal that is one of the acoustic signals obtained on the basis of the reproduction target; and the 2L-th speaker unit emits a 2L-th acoustic signal that is an acoustic signal having a phase opposite to that of the (2L-1)-th acoustic signal. A (2R-1)-th speaker unit and a (2L-1)-th speaker unit are arranged closer to a right ear and a left ear of a user who uses the seat than a 2R-th speaker unit and a 2L-th speaker unit, respectively, or the 2R-th speaker unit and the 2L-th speaker unit are arranged closer to the right ear and the left ear of the user who uses the seat than the (2R-1)-th speaker unit and the (2L-1)-th speaker unit, respectively.

In one aspect of the present invention, a speaker system emits a sound based on a first acoustic signal, . . . , and a sound based on a (2N-1)-th acoustic signal such that the sounds are able to be heard only in the vicinity, where N is any integer greater than or equal to 2 and a (2n-1)-th acoustic signal (n=1, . . . , N) is an acoustic signal obtained on the basis of a reproduction target. The speaker system includes an n-th speaker unit pair (n=1, . . . , N) including a speaker unit (hereinafter, referred to as a positive speaker unit) that emits a sound based on the (2n-1)-th acoustic signal and a speaker unit (hereinafter, referred to as a negative speaker unit) that emits a sound based on a 2n-th acoustic signal that is an acoustic signal having a phase opposite to that of the (2n-1)-th acoustic signal. An R-th speaker unit pair is arranged on a right side from a center of the seat, where R is any of 1, . . . , and N, and an L-th speaker unit pair is arranged on a left side from the center of the seat, where L is any of 1, . . . , and N, and R≠L. A (2R-1)-th speaker unit and a (2L-1)-th speaker unit are arranged closer to a right ear and a left ear of a user who uses the seat than a 2R-th speaker unit and a 2L-th speaker unit, respectively, or the 2R-th speaker unit and the 2L-th speaker unit are arranged closer to the right ear and the left ear of the user who uses the seat than the (2R-1)-th speaker unit and the (2L-1)-th speaker unit, respectively.

Advantageous Effects of Invention

According to the present invention, it is possible to reproduce a sound that can be heard only in a very limited narrow range.

BRIEF DESCRIPTION OF DRAWINGS

FIG. 29 is a block diagram illustrating an example of a configuration of an acoustic system 420.

DESCRIPTION OF EMBODIMENTS

Figure 1:
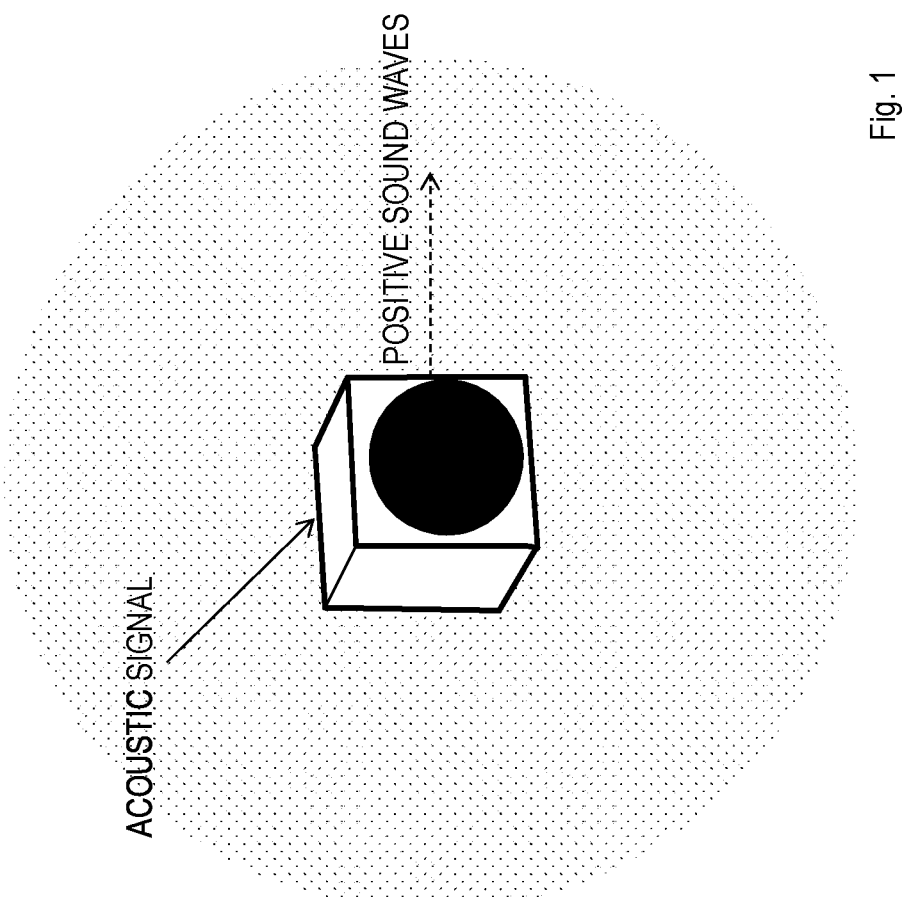
FIG. 1 is a diagram for explaining directivity of a sound emitted from a speaker.

Hereinafter, embodiments of the present invention will be described. Note that components having the same functions are denoted by the same reference numerals, and redundant description will be omitted.

TECHNICAL BACKGROUND

First, a description will be given of directivity of a sound emitted from the speaker. Next, a description will be given of directivity of a sound emitted from a speaker unit pair of the present invention. Finally, a description will be given of a result of an experiment for confirming an effect of the speaker unit pair of the present invention.

«1: Directivity of Sound Emitted from Speaker»

Usually, a speaker includes a speaker unit and a speaker box. The speaker unit is a component including a diaphragm that converts an acoustic signal that is an electric signal into vibration of air (that is, a sound wave is generated). The speaker box is a component that houses the speaker unit.

When the acoustic signal is input to the speaker, the diaphragm of the speaker unit vibrates, and sound waves are emitted in both directions in which the diaphragm vibrates. Here, a sound wave emitted to the outside of the speaker box (that is, a front direction of the speaker unit) is referred to as a positive sound wave, and a sound wave emitted to the inside of the speaker box (that is, a back direction of the speaker unit) is referred to as a negative sound wave. The negative sound wave is a sound wave having a phase opposite to the phase of the positive sound wave. FIG. 1 is a diagram for explaining directivity of a sound emitted from the speaker. As illustrated in FIG. 1, the positive sound wave will be emitted from the speaker in all directions, while the negative sound wave will not come out of the speaker box. As a result, the sound emitted from the speaker is heard in a wide range.

«2: Directivity of Sound Emitted from Speaker Unit Pair»

Figure 2:
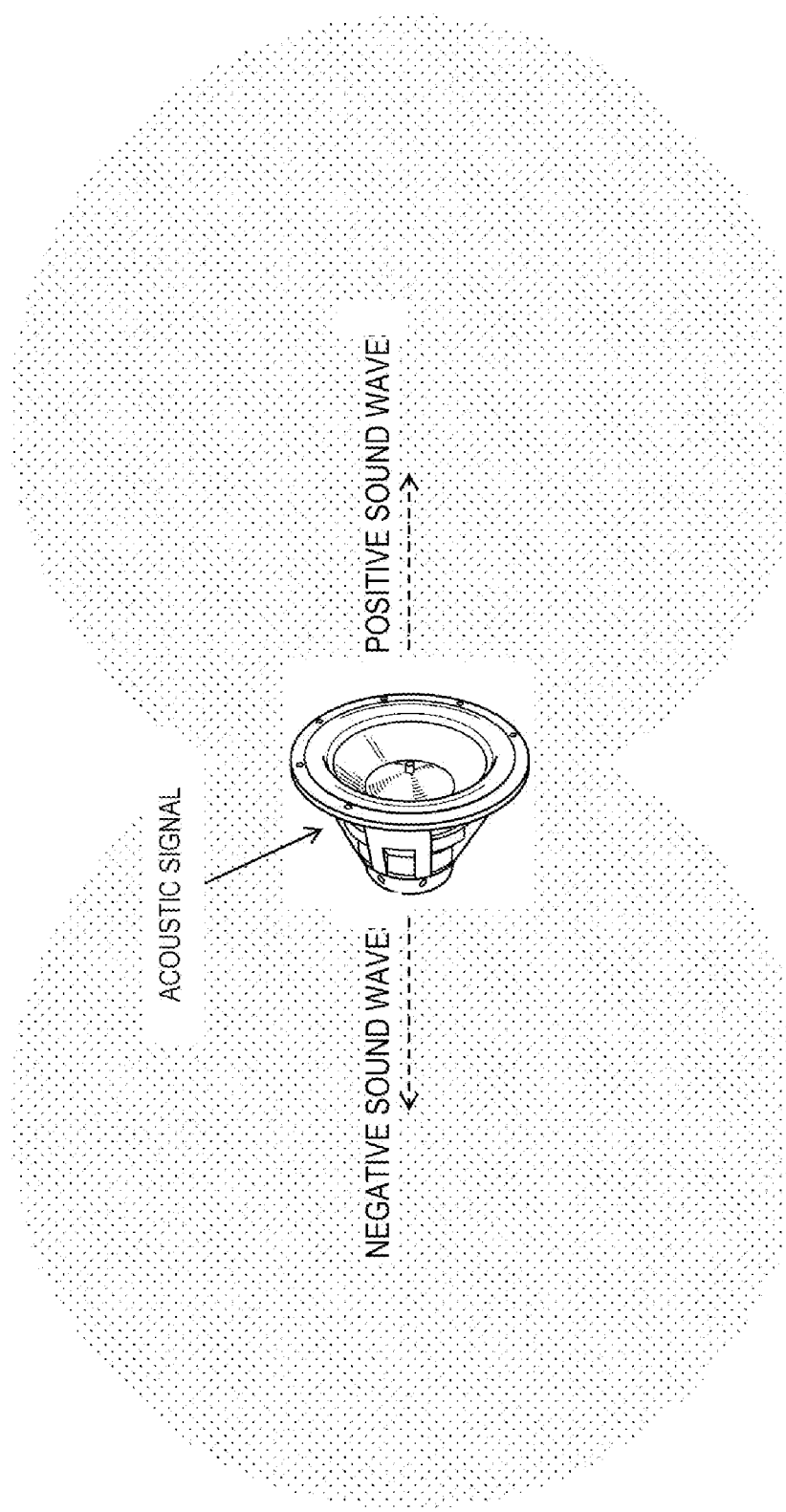
FIG. 2 is a diagram for explaining directivity of a sound emitted from a speaker unit.

Here, first, a description will be given of directivity of a sound emitted from the speaker unit that is a bare speaker. FIG. 2 is a diagram for explaining the directivity of the sound emitted from the speaker unit. In the case of only the speaker unit, the negative sound wave is emitted from the back of the speaker unit hidden in the speaker box, unlike the case of the speaker. For that reason, as illustrated in FIG. 2, the sound emitted from the speaker unit has a characteristic of bi-directivity.

Figure 3:
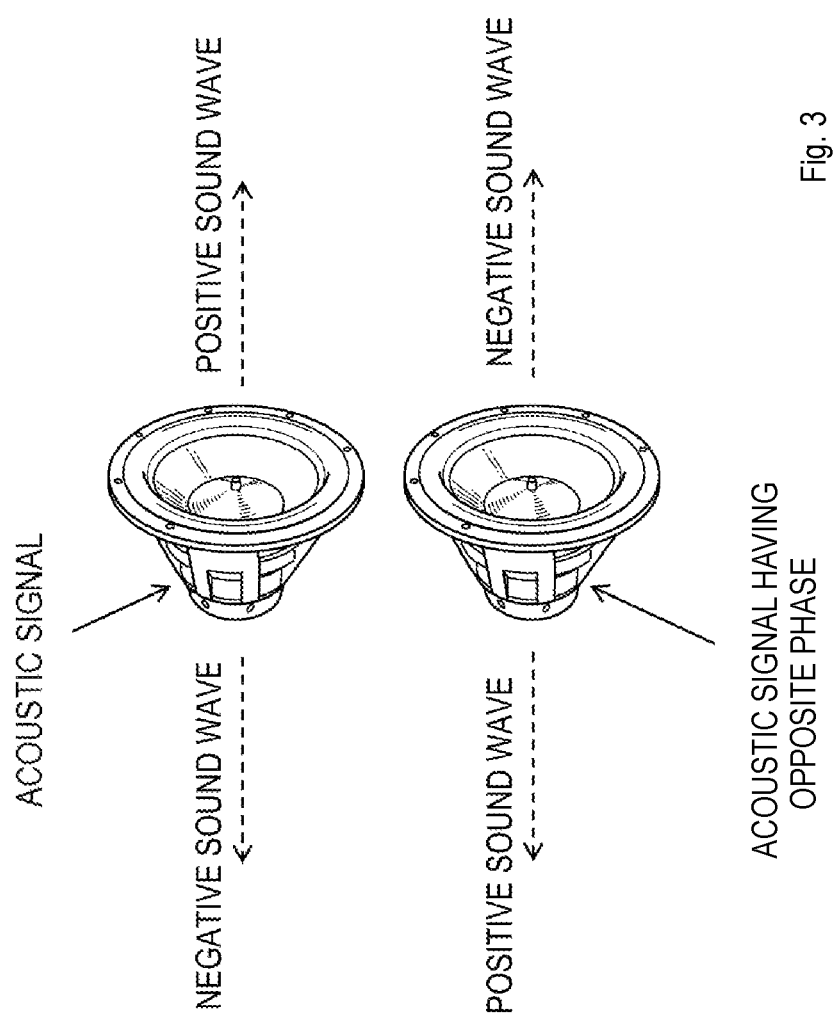
FIG. 3 is a diagram for explaining a sound emitted from a speaker unit pair.
Figure 4:
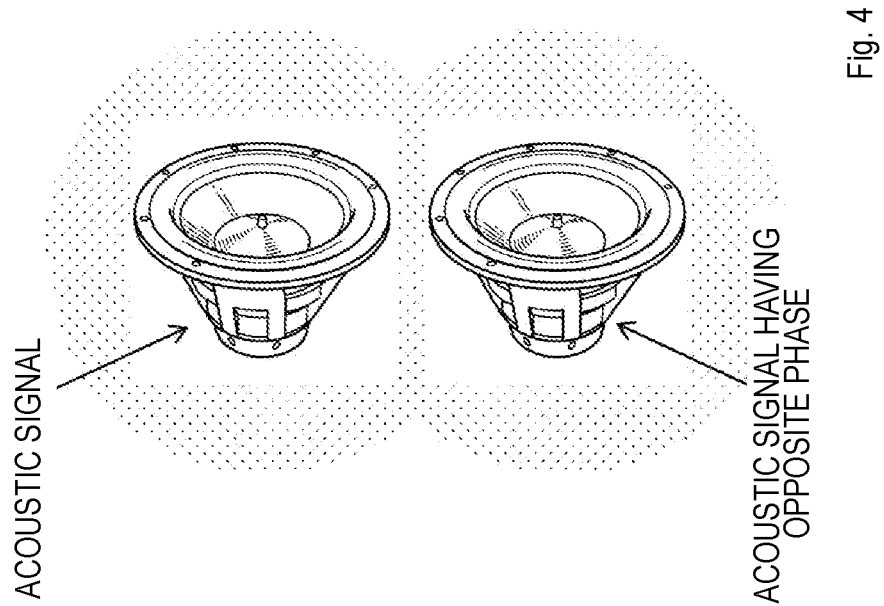
FIG. 4 is a diagram for explaining directivity of the sound emitted from the speaker unit pair.

In the present invention, the bi-directivity is used. Hereinafter, a specific description will be given. First, as illustrated in FIG. 3, two speaker units are arranged to form a speaker unit pair. When acoustic signals having opposite positive/negative relationships are input to the speaker unit pair, diaphragms of the two speaker units vibrate, and sounds based on these two acoustic signals are emitted. Then, as illustrated in FIG. 4, sounds in all directions except for the vicinity of the speaker unit pair are erased. That is, the sounds are erased only at a position sufficiently away from the speaker unit pair, and the sounds are not erased near the speaker unit pair. A reason why the sounds are not erased in the vicinity of the speaker unit pair is that phases of a sound wave emitted from the front of the speaker unit and a sound wave coming around from the back are not the same in the vicinity of the speaker unit pair.

That is, when a predetermined acoustic signal is input to one speaker unit constituting the speaker unit pair and an acoustic signal having a phase opposite to that of the predetermined acoustic signal is input to the other speaker unit, it is possible to create a situation in which only a user in the vicinity of the speaker unit pair hear the sound and other users do not hear the sound by utilizing a property that the sound is heard only in the vicinity of the speaker unit pair.

«3: Experimental Result»

Figure 5:
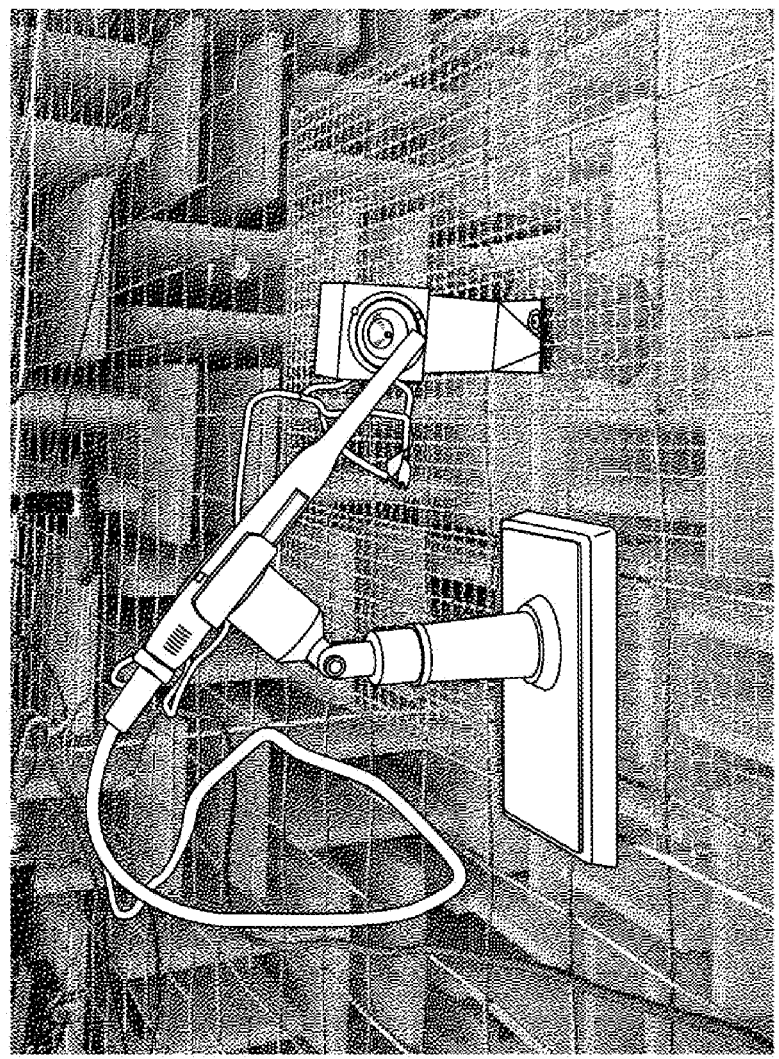
FIG. 5 is a diagram illustrating a state of an experiment (a positional relationship between a speaker and a microphone).
Figure 6:
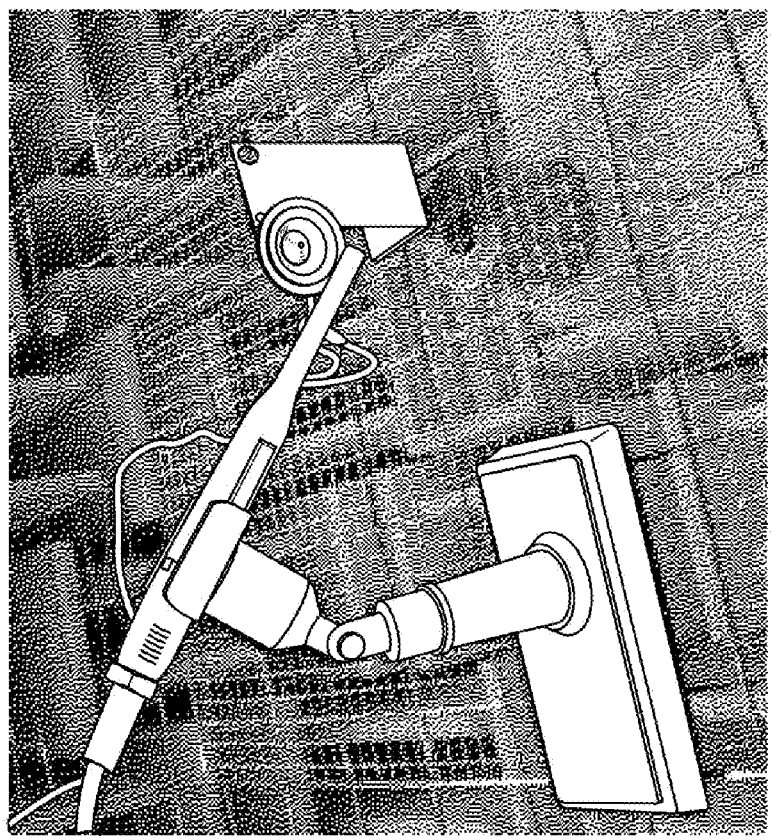
FIG. 6 is a diagram illustrating a state of the experiment (a positional relationship between a speaker unit and the microphone).
Figure 7:
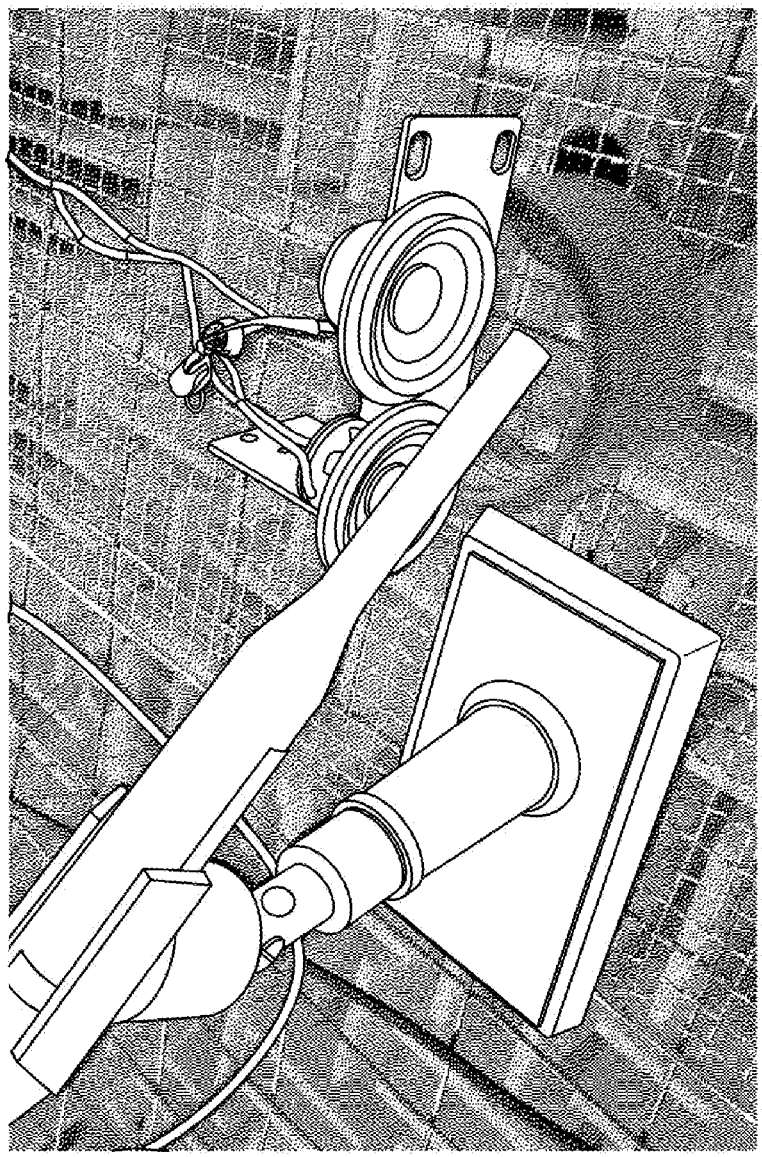
FIG. 7 is a diagram illustrating a state of the experiment (a positional relationship between a speaker unit pair and the microphone).

Here, a description will be given of a result of an experiment for measuring frequency characteristics of a speaker, a speaker unit, and a speaker unit pair. As the speaker, the speaker unit, and the speaker unit pair, the experiment used a speaker having a diaphragm with a diameter of 4.5 cm (see FIG. 5), only a speaker unit obtained by removing a speaker box from the speaker (see FIG. 6), and two of the speaker units arranged (see FIG. 7). In addition, to measure frequency characteristics in the vicinity of the speaker, the speaker unit, and the speaker unit pair, a microphone was installed under the following four conditions.

Figure 8:
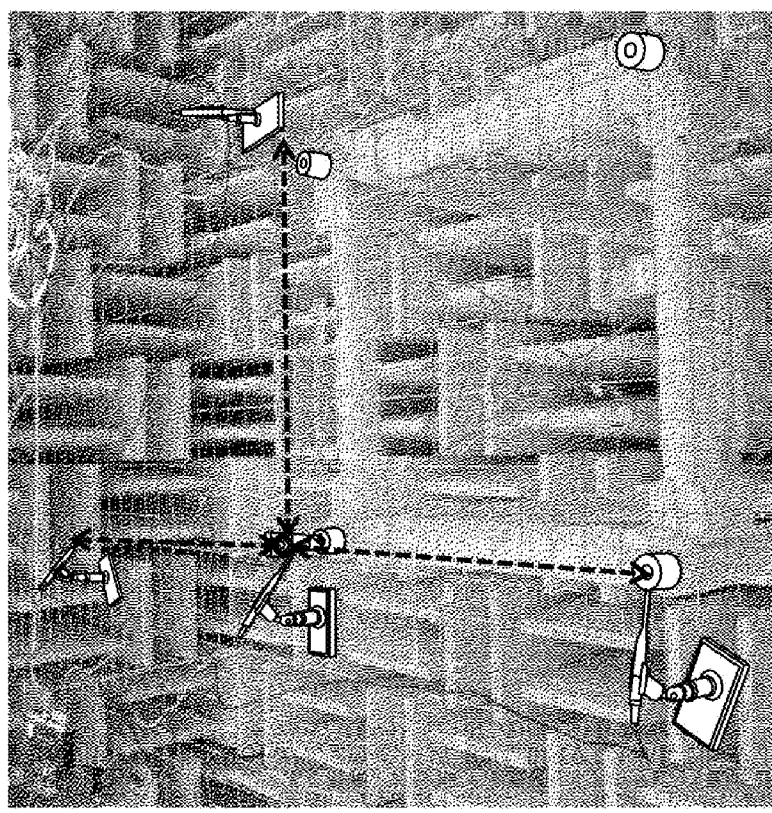
FIG. 8 is a diagram illustrating a state of the experiment (other measurement positions).

(Condition 1) Position 5 cm from the front of the speaker
(Condition 2) Position 5 cm from the front of the speaker unit
(Condition 3) Position 2 cm from the front of the speaker unit
(Condition 4) Position 2 cm from the front of the speaker unit pair In addition, for any condition, for comparison, microphones were also installed at positions 100 cm from the front, back, and side of the speaker, speaker unit, and speaker unit pair, respectively (see FIG. 8).

Figure 9:
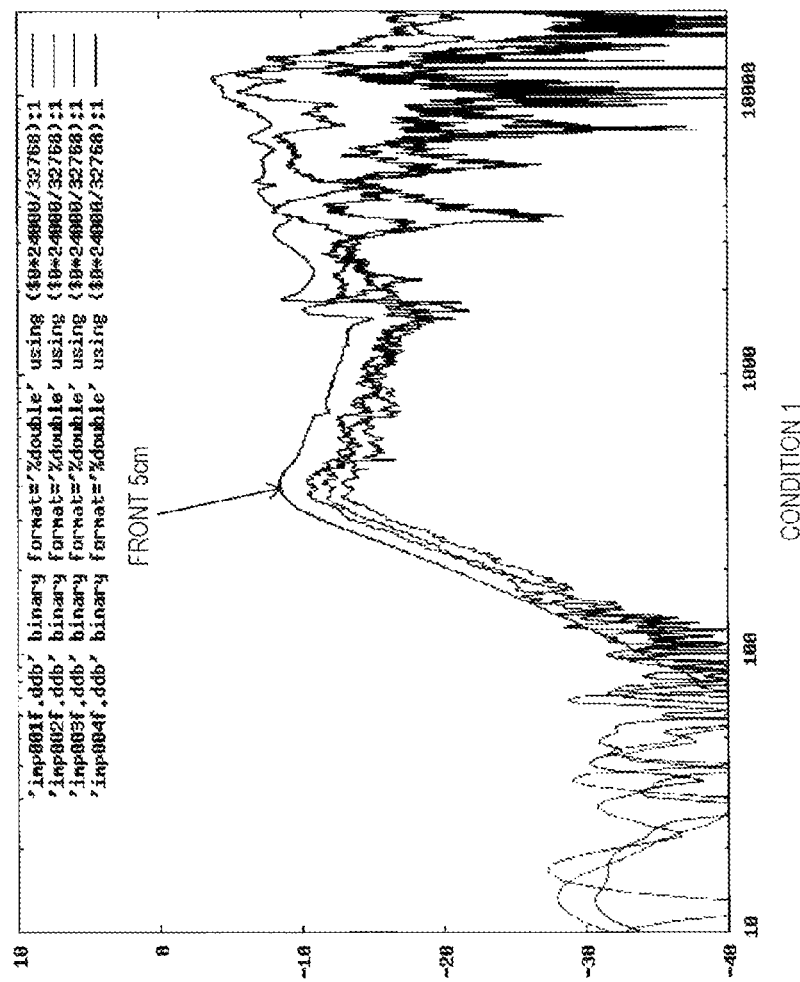
FIG. 9 is a diagram illustrating an experimental result (Condition 1).
Figure 10:
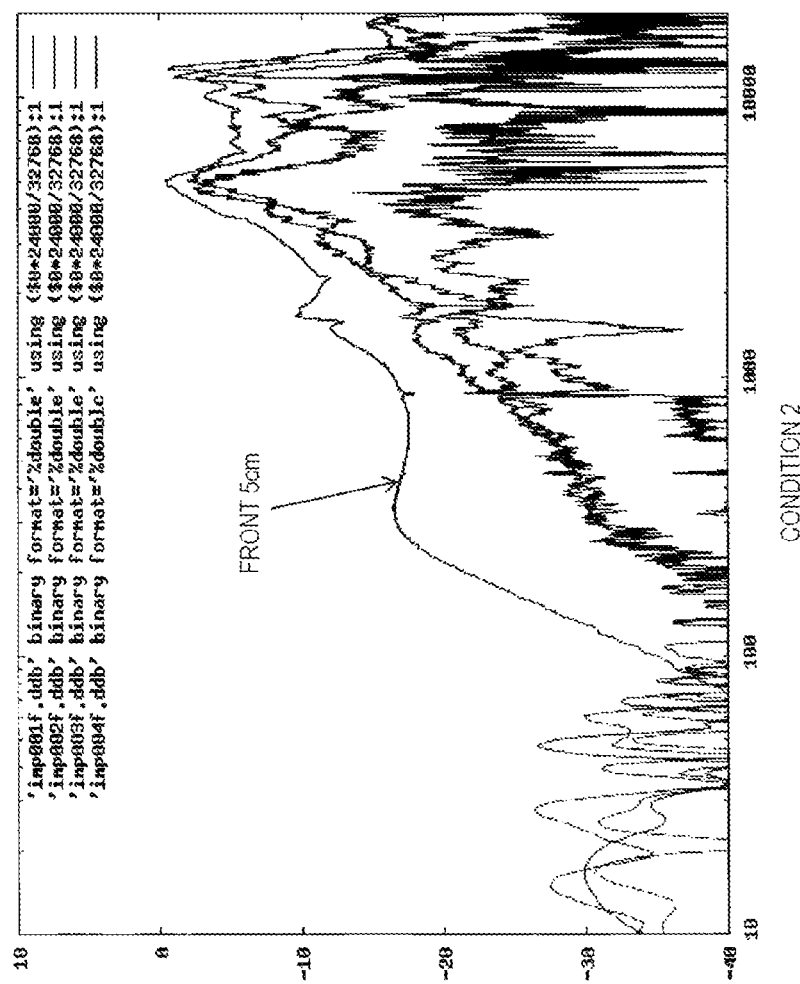
FIG. 10 is a diagram illustrating an experimental result (Condition 2).
Figure 11:
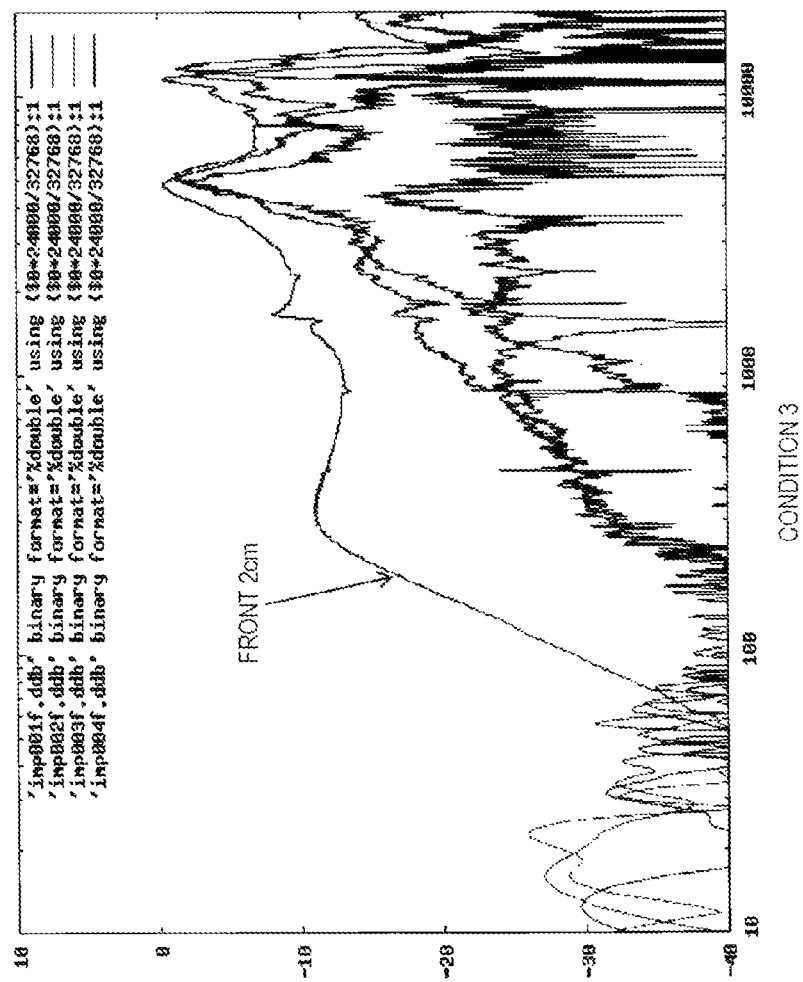
FIG. 11 is a diagram illustrating an experimental result (Condition 3).
Figure 12:
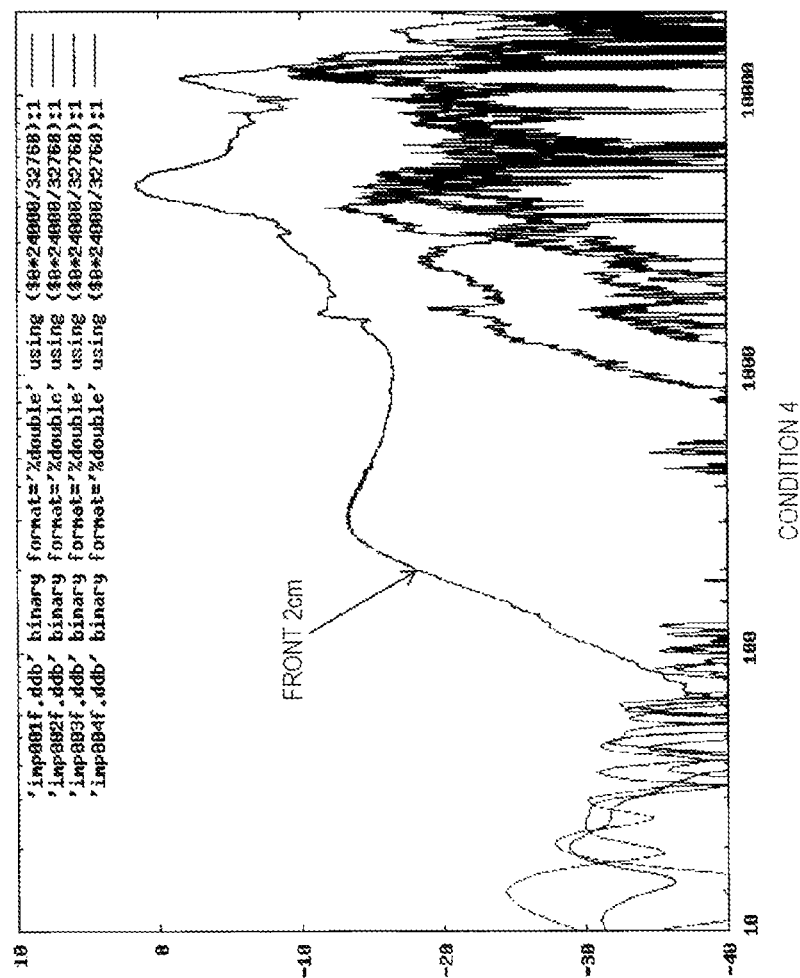
FIG. 12 is a diagram illustrating an experimental result (Condition 4).

Hereinafter, the experimental result will be described. FIGS. 9, 10, 11, and 12 are diagrams illustrating the experimental result, and are diagrams illustrating relationships between frequencies and attenuation under Condition 1, Condition 2, Condition 3, and Condition 4, respectively. In each figure, four curves are illustrated, one curve indicated by an arrow is obtained by collecting sound with the microphone at the position 5 cm or 2 cm from the front, and the other three curves are obtained by collecting sound with the microphones at positions 100 cm from the front, back, and side. Note that the curve at the position 5 cm or 2 cm from the front is located in the vicinity of the speaker or the like, and thus, has a very large gain. Thus, the curve at the position 5 cm from the front is plotted at −25 dB from the three curves at 100 cm positions for easy viewing. Similarly, the curve at the position 2 cm from the front is plotted at −32 dB. When FIG. 9 is compared with FIG. 10, it can be seen that there is almost no difference between the four curves in a case where the speaker is used, whereas there is a difference between the curve at the position 5 cm from the front and the other three curves in a case where the speaker unit is used. This difference is more remarkable as the frequency is lower. In addition, when FIG. 11 is compared with FIG. 12, it can be seen that the speaker unit pair has a larger difference between the curve at the position 2 cm from the front and the other three curves than the speaker unit.

As described above, it has been confirmed by the experiment that the sound emitted from the speaker unit pair of the present invention is heard only in the vicinity of the speaker unit pair.

First Embodiment

A system that reproduces an acoustic signal obtained on the basis of a reproduction target is referred to as an acoustic system. The acoustic system includes a speaker system for emitting the acoustic signal as a sound (hereinafter, this sound is referred to as a sound based on the acoustic signal). Here, the speaker system is a device that converts the acoustic signal that is an analog signal into the sound. In addition, the reproduction target is, for example, data or a signal from which an acoustic signal can be obtained by predetermined processing, such as data recorded in a CD, a DVD, or a record, data received through the Internet, or a signal received through radio broadcasting or television broadcasting.

Figure 13:
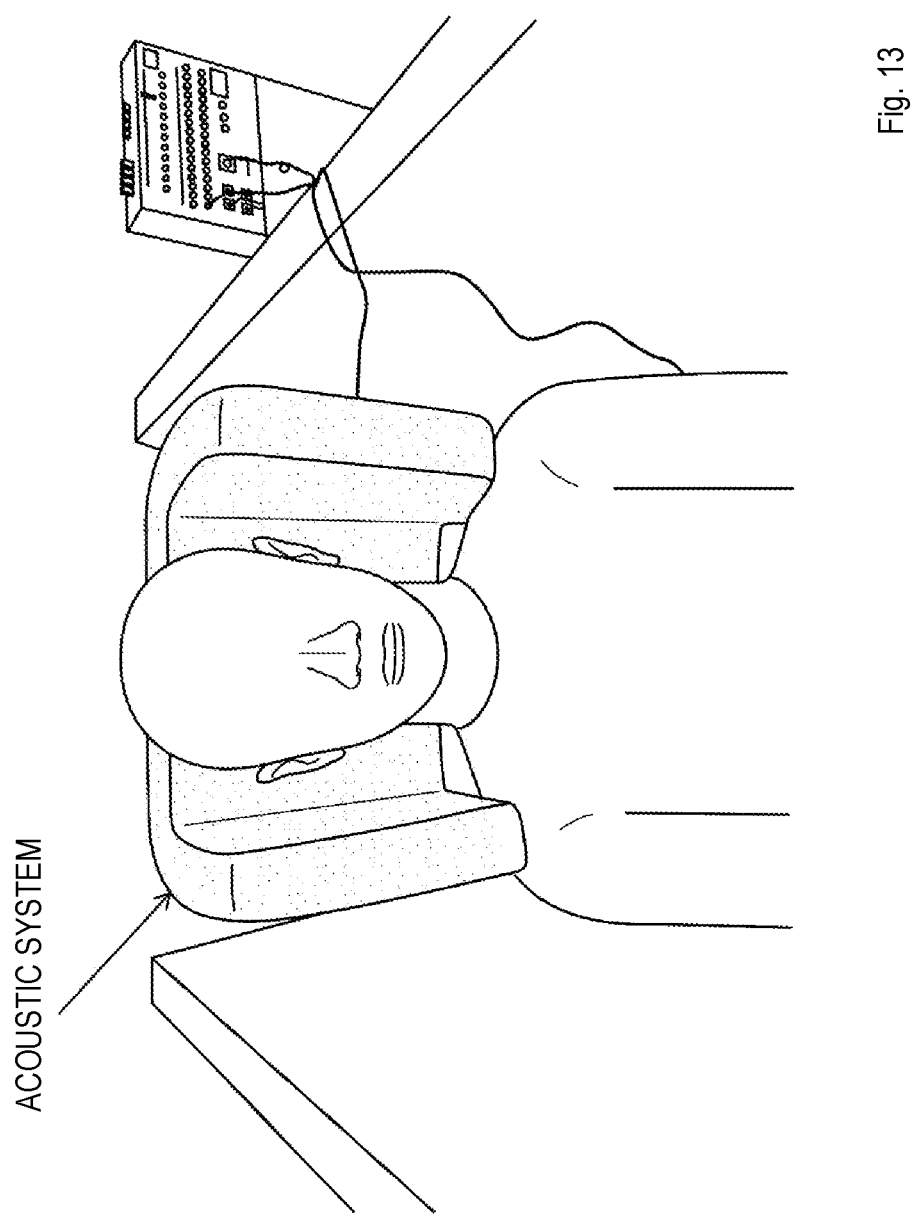
FIG. 13 is a diagram illustrating an example of an acoustic system installed in a seat of an aircraft.

Here, a description will be given of an acoustic system that reproduces a sound based on an acoustic signal obtained from the reproduction target so that only a user in the vicinity of the speaker system can hear the sound. That is, the reproduced sound of the acoustic system cannot be heard by users other than the user in the vicinity of the speaker system. When such an acoustic system is used, for example, as an acoustic system for a user who uses a seat of an aircraft, it is possible to provide a system in which only the user who uses the seat can hear the reproduced sound. FIG. 13 is a diagram illustrating an example of the acoustic system installed in the seat of the aircraft. The acoustic system in FIG. 13 is installed on the seat to sandwich the head of the seated user, and two speaker unit pairs are arranged to be near the left and right ears. Note that such an acoustic system can also be installed in vehicles other than aircrafts such as automobiles and trains, a reclining chair, and the like, and can also be installed in a wearable form such as being placed on a shoulder. In addition, a driver unit pair in which two driver units corresponding to the above-described speaker unit pair are arranged may be installed in each of left and right units of headphones and earphones. The headphones are generally roughly classified into two types, an open type (open air type) and a sealed type (closed type), and when the above-described technology is applied particularly to the open type in which there is a concern about sound leakage, the sound leakage is expected to be reduced.

Figure 14:
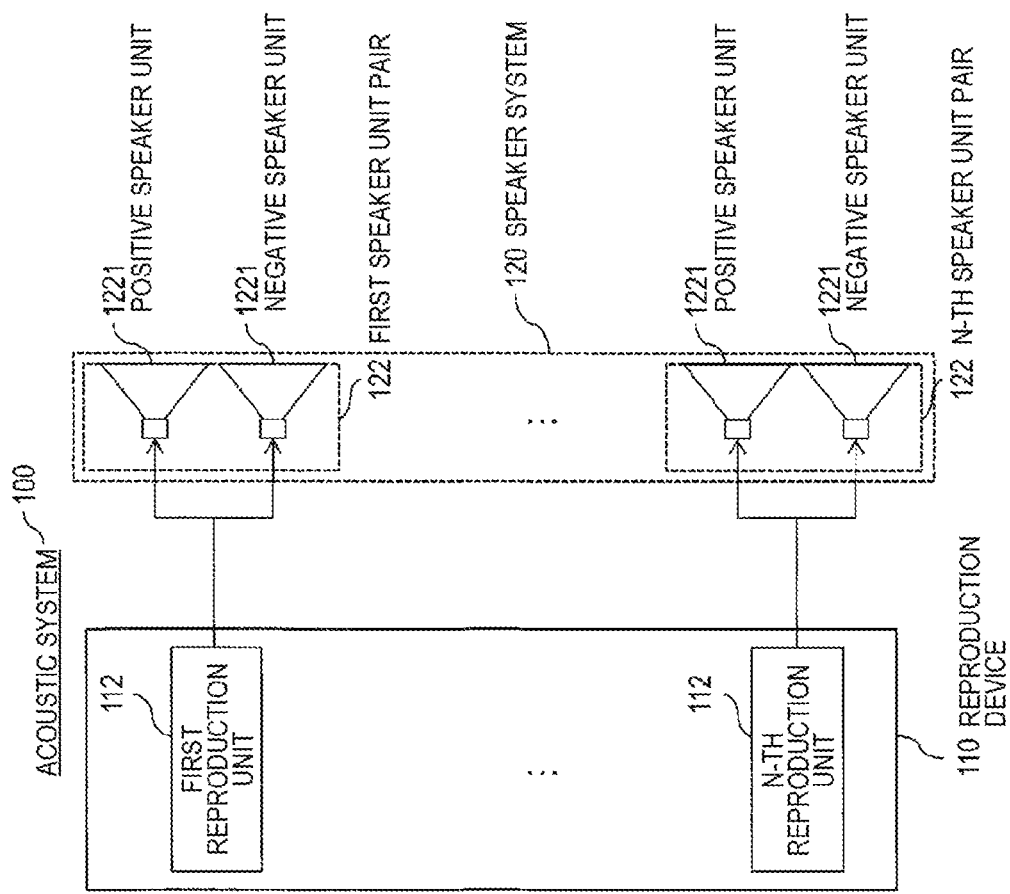
FIG. 14 is a block diagram illustrating an example of a configuration of an acoustic system 100.

Hereinafter, an acoustic system 100 will be described with reference to FIG. 14. FIG. 14 is a block diagram illustrating a configuration of the acoustic system 100. As illustrated in FIG. 14, the acoustic system 100 includes a reproduction device 110 and a speaker system 120. The reproduction device 110 includes N (where N is an integer greater than or equal to 1) reproduction units 112 (that is, a first reproduction unit 112, . . . , and an N-th reproduction unit 112). In addition, the speaker system 120 also includes N speaker unit pairs 122 (that is, a first speaker unit pair 122, . . . , and an N-th speaker unit pair 122). Each speaker unit pair 122 includes two speaker units (that is, a positive speaker unit 1221 and a negative speaker unit 1221). An acoustic signal having a phase opposite to that of an acoustic signal input to the positive speaker unit 1221 is input to the negative speaker unit 1221. The speaker system 120 is installed at a place close to the head of the user who uses the seat.

Note that a direction in which the n-th speaker unit pair 122 faces the user is defined as an n-th user direction (n=1, ..., N), and the positive speaker unit 1221 and the negative speaker unit 1221 of the n-th speaker unit pair 122 (n=1, ..., N) are arranged so that a sound emitted from the positive speaker unit 1221 in a direction opposite to the n-th user direction and a sound emitted from the negative speaker unit 1221 in the direction opposite to the n-th user direction are transmitted in the n-th user direction by coming around. Here, the n-th user direction is a front direction of the positive speaker unit 1221 and the negative speaker unit 1221 of the n-th speaker unit pair 122. In addition, the direction opposite to the n-th user direction is a back direction of the positive speaker unit 1221 and the negative speaker unit 1221 of the n-th speaker unit pair 122.

In addition, the positive speaker unit 1221 and the negative speaker unit 1221 of the n-th speaker unit pair 122 (n=1, ..., N) are arranged in a positional relationship in which a sound emitted from the positive speaker unit 1221 and a sound emitted from the negative speaker unit 1221 are mutually erased so that the sounds cannot be heard by a user who uses another seat.

Hereinafter, operation of the acoustic system 100 will be described with reference to FIG. 14.

With a first acoustic signal, a third acoustic signal, ..., and a (2N-1)-th acoustic signal that are acoustic signals obtained on the basis of the reproduction target as inputs, the reproduction device 110 outputs the first acoustic signal, the second acoustic signal, ..., and a 2N-th acoustic signal. More specifically, an n-th reproduction unit 112 (n=1, ..., N) generates a 2n-th acoustic signal that is an acoustic signal having a phase opposite to that of a (2n-1)-th acoustic signal from the (2n-1)-th acoustic signal, with the (2n-1)-th acoustic signal as an input, and outputs the (2n-1)-th acoustic signal and the 2n-th acoustic signal. The (2n-1)-th acoustic signal and the 2n-th acoustic signal are input to the positive speaker unit 1221 and the negative speaker unit 1221 of the n-th speaker unit pair 122, respectively.

The speaker system 120 emits a sound based on the first acoustic signal, a sound based on the second acoustic signal, ..., and a sound based on the 2N-th acoustic signal, with the first acoustic signal, the second acoustic signal, ..., and the 2N-th acoustic signal output by the reproduction device 110 as inputs. More specifically, the n-th speaker unit pair 122 (n=1, ..., N) emits a sound based on the (2n-1)-th acoustic signal from the positive speaker unit 1221, and emits a sound based on the 2n-th acoustic signal from the negative speaker unit 1221, with the (2n-1)-th acoustic signal and the 2n-th acoustic signal as inputs. Since the (2n-1)-th acoustic signal and the 2n-th acoustic signal are in opposite phase relationship with each other, the sound is heard only in the vicinity of the seat where the speaker system 120 is installed as described in <Technical Background>. For example, in the case of N=2, when the first acoustic signal and the third acoustic signal are respectively an acoustic signal of a right channel and an acoustic signal of a left channel of a certain sound source, a stereo sound can be heard only in the vicinity of the seat where the speaker system 120 is installed.

Note that a sound emitted from the positive speaker unit 1221 of the n-th speaker unit pair 122 in the n-th user direction and a sound emitted from the positive speaker unit 1221 of the n-th speaker unit pair 122 in the direction opposite to the n-th user direction are in opposite phase relationship with each other. Similarly, a sound emitted from the negative speaker unit 1221 of the n-th speaker unit pair 122 in the n-th user direction and a sound emitted from the negative speaker unit 1221 of the n-th speaker unit pair 122 in the direction opposite to the n-th user direction are in opposite phase relationship with each other.

According to the embodiment of the present invention, it is possible to reproduce a sound that can be heard only in a very limited narrow range that is the vicinity of the speaker system.

Second Embodiment

In the acoustic system 100 of the first embodiment, a range in which emitted sound is heard, that is, a so-called sweet spot is narrow. Here, a description will be given of an acoustic system having a structure for enlarging the sweet spot.

Figure 15:
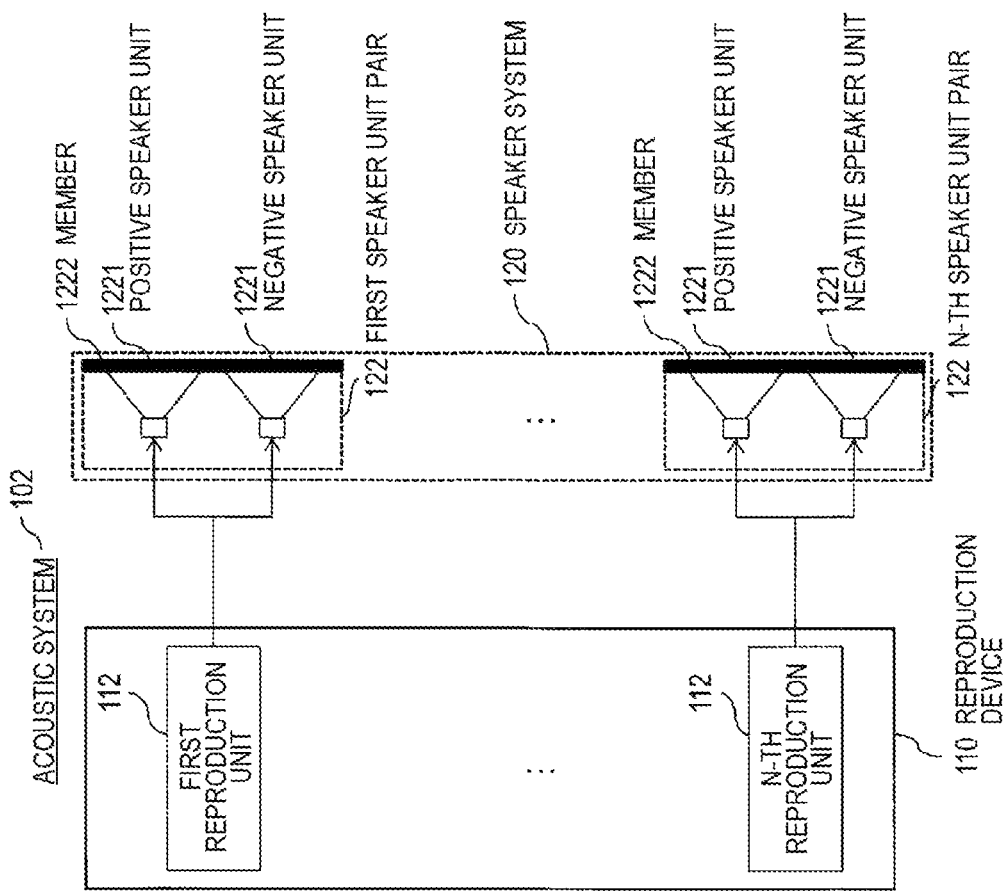
FIG. 15 is a block diagram illustrating an example of a configuration of an acoustic system 102.

Hereinafter, an acoustic system 102 will be described with reference to FIG. 15. FIG. 15 is a block diagram illustrating a configuration of the acoustic system 102. As illustrated in FIG. 15, similarly to the acoustic system 100, the acoustic system 102 includes a reproduction device 110 and a speaker system 120. However, the acoustic system 102 is different from the acoustic system 100 in that a member 1222 is attached to the speaker unit pair 122.

Hereinafter, a structure of the n-th speaker unit pair 122 (n=1, ..., N) will be described with reference to FIG. 15.

Figure 16:
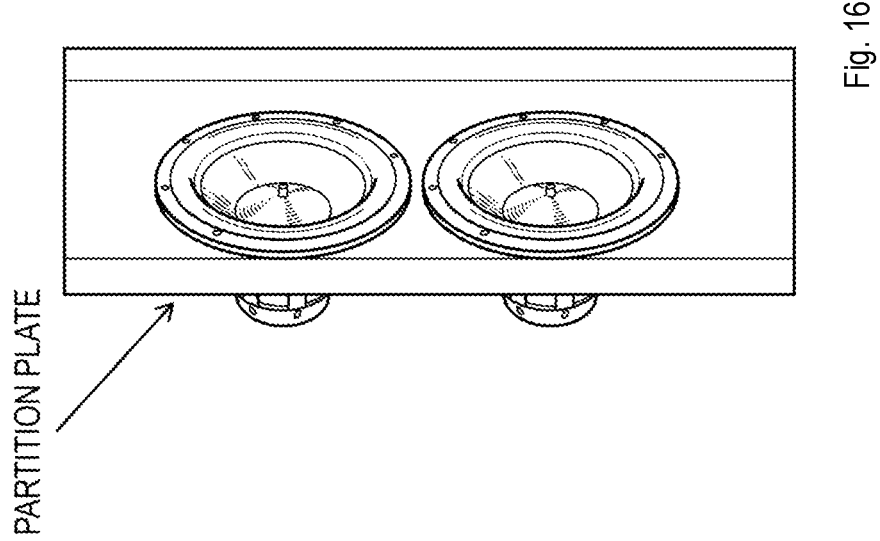
FIG. 16 is a diagram illustrating an example of a configuration of a speaker unit pair 122 to which a member 1222 is attached.

The member 1222 is attached to the n-th speaker unit pair 122 to lengthen a sound path in which sounds emitted from the positive speaker unit 1221 and the negative speaker unit 1221 of the n-th speaker unit pair 122 in the direction opposite to the n-th user direction come around in the user direction (see FIG. 16). The member 1222 may be, for example, a member such as a partition plate that prevents coming around of the sound from the back of the speaker unit. The member 1222 is attached not to prevent the coming around of the sound but to increase a phase difference between the sound coming around from the back and the sound from the front, that is, to increase the path of the sound coming around.

The n-th speaker unit pair 122 to which the member 1222 is attached has a larger sweet spot than that of the n-th speaker unit pair 122 of the first embodiment.

According to the embodiment of the present invention, it is possible to reproduce a sound that can be heard only in a very limited narrow range that is the vicinity of the speaker system.

Third Embodiment

Since a high-frequency sound has a short wavelength, it is difficult to make phases of a sound coming around from the back and a sound from the front the same. For that reason, the high-frequency sound has a characteristic of being less likely to be erased in the vicinity of the speaker unit and in a relatively distant place other than the vicinity as compared with the low-frequency sound. Since neither the positive speaker unit 1221 nor the negative speaker unit 1221 of the speaker unit pair 122 constituting the acoustic system 100 of the first embodiment is housed in the speaker box, a range in which the high-frequency sound is heard is wide due to the characteristic, and sound leakage may occur. Thus, here, a description will be given of an acoustic system having a structure in which the high-frequency sound is less likely to leak out of the vicinity of the speaker system.

Figure 17:
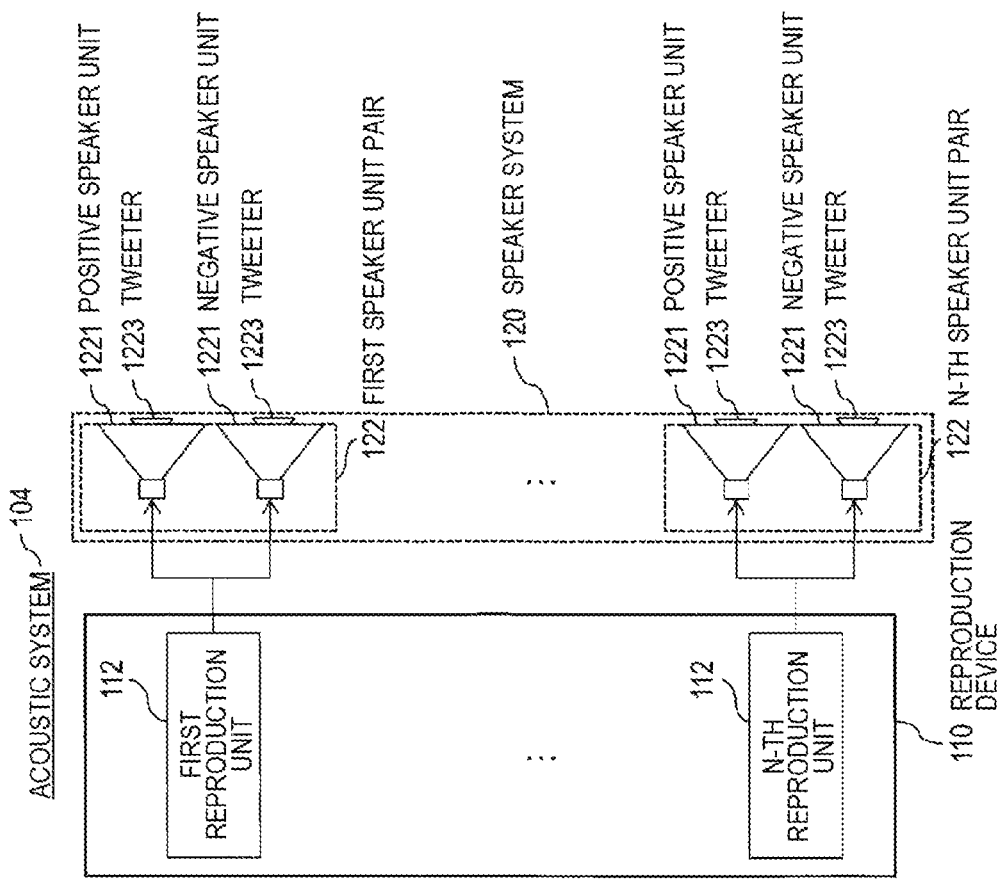
FIG. 17 is a block diagram illustrating an example of a configuration of an acoustic system 104.

Hereinafter, an acoustic system 104 will be described with reference to FIG. 17. FIG. 17 is a block diagram illustrating a configuration of the acoustic system 104. As illustrated in FIG. 17, similarly to the acoustic system 100, the acoustic system 104 includes a reproduction device 110 and a speaker system 120. However, the acoustic system 104 is different from the acoustic system 100 in that a tweeter 1223 is attached to each of the positive speaker unit 1221 and the negative speaker unit 1221 of the speaker unit pair 122. Here, the tweeter is a speaker unit for reproducing a high-frequency signal. It is assumed that the tweeter 1223 is attached to the positive speaker unit 1221 and the negative speaker unit 1221 in a form in which the sound from the back does not leak as if the tweeter 1223 were housed in the speaker box.

Hereinafter, operation of the speaker system 120 will be described with reference to FIG. 17.

The speaker system 120 emits a sound based on the first acoustic signal, a sound based on the second acoustic signal, . . . , and a sound based on the 2N-th acoustic signal, with the first acoustic signal, the second acoustic signal, . . . , and the 2N-th acoustic signal output by the reproduction device 110 as inputs. More specifically, the n-th speaker unit pair 122 (n=1, . . . , N) emits a sound based on the (2n-1)-th acoustic signal from the positive speaker unit 1221 and the tweeter 1223 attached to the positive speaker unit 1221, and emits a sound based on the 2n-th acoustic signal from the negative speaker unit 1221 and the tweeter 1223 attached to the negative speaker unit 1221, with the (2n-1)-th acoustic signal and the 2n-th acoustic signal as inputs.

A higher frequency sound has a property of higher straightness, but since the system has a shape in which a sound from the back of the tweeter 1223 does not leak, it is possible to prevent a high-frequency sound emitted from tweeter 1223 from leaking in all directions.

According to the embodiment of the present invention, it is possible to reproduce a sound that can be heard only in a very limited narrow range that is the vicinity of the speaker system.

Fourth Embodiment

The tweeter is a speaker unit for reproducing a high-frequency signal. Thus, only the high-frequency signal may be input to the tweeter by band division processing. Thus, here, a description will be given of an acoustic system that performs band division processing.

Figure 18:
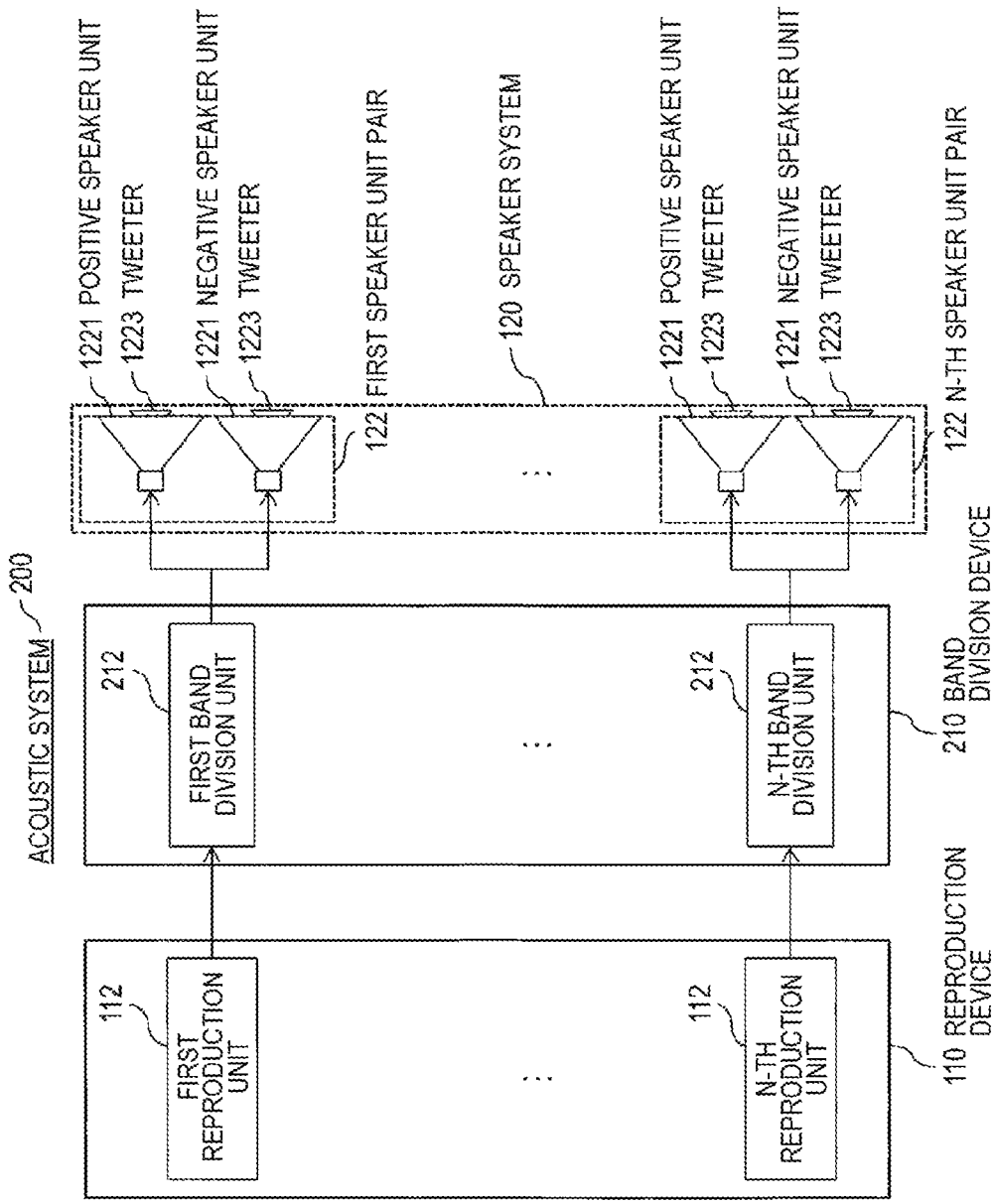
FIG. 18 is a block diagram illustrating an example of a configuration of an acoustic system 200.

Hereinafter, an acoustic system 200 will be described with reference to FIG. 18. FIG. 18 is a block diagram illustrating a configuration of the acoustic system 200. As illustrated in FIG. 18, the acoustic system 200 includes a reproduction device 110, a band division device 210, and a speaker system 120. The band division device 210 includes N band division units 212 (that is, a first band division unit 212, . . . , and an N-th band division unit 212). The acoustic system 200 is different from the acoustic system 104 in that the band division device 210 is included.

Hereinafter, operation of the band division device 210 and the speaker system 120 will be described with reference to FIG. 18.

The band division device 210 outputs a first high-frequency signal that is a high-frequency signal and a first low-frequency signal that is a low-frequency signal of the first acoustic signal, a second high-frequency signal that is a high-frequency signal and a second low-frequency signal that is a low-frequency signal of the second acoustic signal, . . . , and a 2N-th high-frequency signal that is a high-frequency signal and a 2N-th low-frequency signal that is a low-frequency signal of the 2N-th acoustic signal, with the first acoustic signal, the second acoustic signal, . . . , and the 2N-th acoustic signal output by the reproduction device 110 as inputs. More specifically, the n-th band division unit 212 (n=1, . . . , N) generates the (2n-1)-th high-frequency signal that is a high-frequency signal and the (2n-1)-th low-frequency signal that is a low-frequency signal of the (2n-1)-th acoustic signal, generates the 2n-th high-frequency signal that is a high-frequency signal and the 2n-th low-frequency signal that is a low-frequency signal of the 2n-th acoustic signal, with the (2n-1)-th acoustic signal and the 2n-th acoustic signal as inputs, and outputs the (2n-1)-th high-frequency signal, the (2n-1)-th low-frequency signal, the 2n-th high-frequency signal, and the 2n-th low-frequency signal.

The speaker system 120 emits a sound based on the first high-frequency signal, a sound based on the first low-frequency signal, a sound based on the second high-frequency signal, a sound based on the second low-frequency signal, . . . , a sound based on the 2N-th high-frequency signal, and a sound based on the 2N-th low-frequency signal, with the first high-frequency signal, the first low-frequency signal, the second high-frequency signal, the second low-frequency signal, . . . , the 2N-th high-frequency signal, and the 2N-th low-frequency signal output by the band division device 210 as inputs. More specifically, the n-th speaker unit pair 122 (n=1, . . . , N) emits a sound based on the (2n-1)-th low-frequency signal and a sound based on the (2n-1)-th high-frequency signal from the positive speaker unit 1221 and the tweeter 1223 attached to the positive speaker unit 1221, respectively, and emits a sound based on the 2n-th low-frequency signal and a sound based on the 2n-th high-frequency signal from the negative speaker unit 1221 and the tweeter 1223 attached to the negative speaker unit 1221, respectively, with the (2n-1)-th high-frequency signal, the (2n-1)-th low-frequency signal, the 2n-th high-frequency signal, and the 2n-th low-frequency signal as inputs.

According to the embodiment of the present invention, it is possible to reproduce a sound that can be heard only in a very limited narrow range that is the vicinity of the speaker system.

Fifth Embodiment

In the acoustic system 200 of the fourth embodiment, a speaker unit is used in which the tweeter 1223 is attached to the positive speaker unit 1221 and the negative speaker unit 1221. Here, a description will be given of an acoustic system using a speaker unit pair including two speaker units and one tweeter instead of using a speaker unit pair including two speaker units to which respective tweeters are attached.

Figure 19:
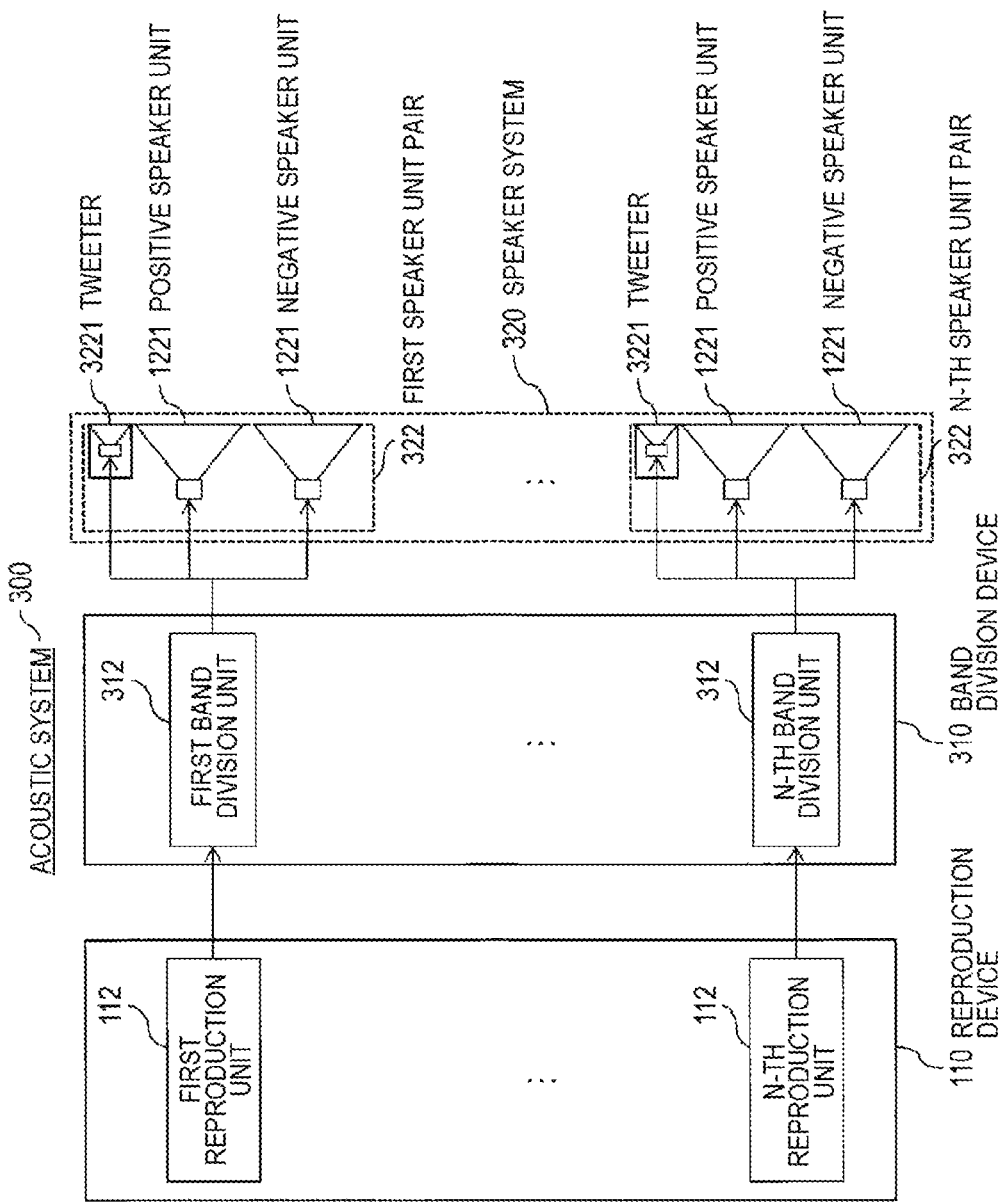
FIG. 19 is a block diagram illustrating an example of a configuration of an acoustic system 300.

Hereinafter, an acoustic system 300 will be described with reference to FIG. 19. FIG. 19 is a block diagram illustrating a configuration of the acoustic system 300. As illustrated in FIG. 19, the acoustic system 300 includes a reproduction device 110, a band division device 310, and a speaker system 320. The band division device 310 includes N band division units 312 (that is, a first band division unit 312, . . . , and an N-th band division unit 312). In addition, the speaker system 320 also includes N speaker unit pairs 322 (that is, a first speaker unit pair 322, . . . , and an N-th speaker unit pair 322). Each speaker unit pair 322 includes two speaker units (that is, the positive speaker unit 1221 and the negative speaker unit 1221) and a tweeter 3221. The acoustic system 300 is different from the acoustic system 200 in that the band division device 310 and the speaker system 320 are included instead of the band division device 210 and the speaker system 120.

Preferably, the tweeter 3221 is housed in a speaker box not to leak a sound from the back. In addition, the speaker system 320 is installed at a place close to the head of the user who uses the seat.

Note that a direction in which the n-th speaker unit pair 322 faces the user is defined as an n-th user direction (n=1, ..., N), and the positive speaker unit 1221 and the negative speaker unit 1221 of the n-th speaker unit pair 322 (n=1, ..., N) are arranged so that a sound emitted from the positive speaker unit 1221 in the direction opposite to the n-th user direction and a sound emitted from the negative speaker unit 1221 in the direction opposite to the n-th user direction are transmitted in the n-th user direction by coming around. Here, the n-th user direction is a front direction of the positive speaker unit 1221, the negative speaker unit 1221, and the tweeter 3221 of the n-th speaker unit pair 322. In addition, the direction opposite to the n-th user direction is a back direction of the positive speaker unit 1221, the negative speaker unit 1221, and the tweeter 3221 of the n-th speaker unit pair 322.

In addition, the positive speaker unit 1221 and the negative speaker unit 1221 of the n-th speaker unit pair 322 (n=1, ..., N) are arranged in a positional relationship in which a sound emitted from the positive speaker unit 1221 and a sound emitted from the negative speaker unit 1221 are mutually erased so that the sounds cannot be heard by a user who uses another seat.

Hereinafter, operation of the band division device 310 and the speaker system 320 will be described with reference to FIG. 19.

The band division device 310 outputs the first high-frequency signal that is a high-frequency signal and the first low-frequency signal that is a low-frequency signal of the first acoustic signal, the second low-frequency signal that is a low-frequency signal of the second acoustic signal, ..., the (2N-1)-th high-frequency signal that is a high-frequency signal and the (2N-1)-th low-frequency signal that is a low-frequency signal of the (2N-1)-th acoustic signal, and the 2N-th low-frequency signal that is a low-frequency signal of the 2N-th acoustic signal, with the first acoustic signal, the second acoustic signal, ..., and the 2N-th acoustic signal output by the reproduction device 110 as inputs. More specifically, the n-th band division unit 312 (n=1, ..., N) generates the (2n-1)-th high-frequency signal that is a high-frequency signal and the (2n-1)-th low-frequency signal that is a low-frequency signal of the (2n-1)-th acoustic signal, generates the 2n-th low-frequency signal that is a low-frequency signal of the 2n-th acoustic signal, with the (2n-1)-th acoustic signal and the 2n-th acoustic signal as inputs, and outputs the (2n-1)-th high-frequency signal, the (2n-1)-th low-frequency signal, and the 2n-th low-frequency signal.

The speaker system 320 emits a sound based on the first high-frequency signal, a sound based on the first low-frequency signal, a sound based on the second low-frequency signal, ..., a sound based on the (2N-1)-th high-frequency signal, a sound based on the (2N-1)-th low-frequency signal, and a sound based on the 2N-th low-frequency signal, with the first high-frequency signal, the first low-frequency signal, the second low-frequency signal, ..., the (2N-1)-th high-frequency signal, the (2N-1)-th low-frequency signal, and the 2N-th low-frequency signal output by the band division device 310 as inputs. More specifically, the n-th speaker unit pair 322 (n=1, ..., N) emits a sound based on the (2n-1)-th high-frequency signal from the tweeter 3221, emits a sound based on the (2n-1)-th low-frequency signal from the positive speaker unit 1221, and emits a sound based on the 2n-th low-frequency signal from the negative speaker unit 1221, with the (2n-1)-th high-frequency signal, the (2n-1)-th low-frequency signal, and the 2n-th low-frequency signal as inputs.

According to the embodiment of the present invention, it is possible to reproduce a sound that can be heard only in a very limited narrow range that is the vicinity of the speaker system.

Sixth Embodiment

By using the speaker unit 1221 to which the tweeter 1223 is attached, the acoustic system 104 of the third embodiment is a system in which a high-frequency sound hardly leaks. Here, a description will be given of an acoustic system in which a member having a sound absorbing characteristic is used instead of using a speaker unit to which a tweeter is attached, and a high-frequency sound hardly leaks.

Figure 20:
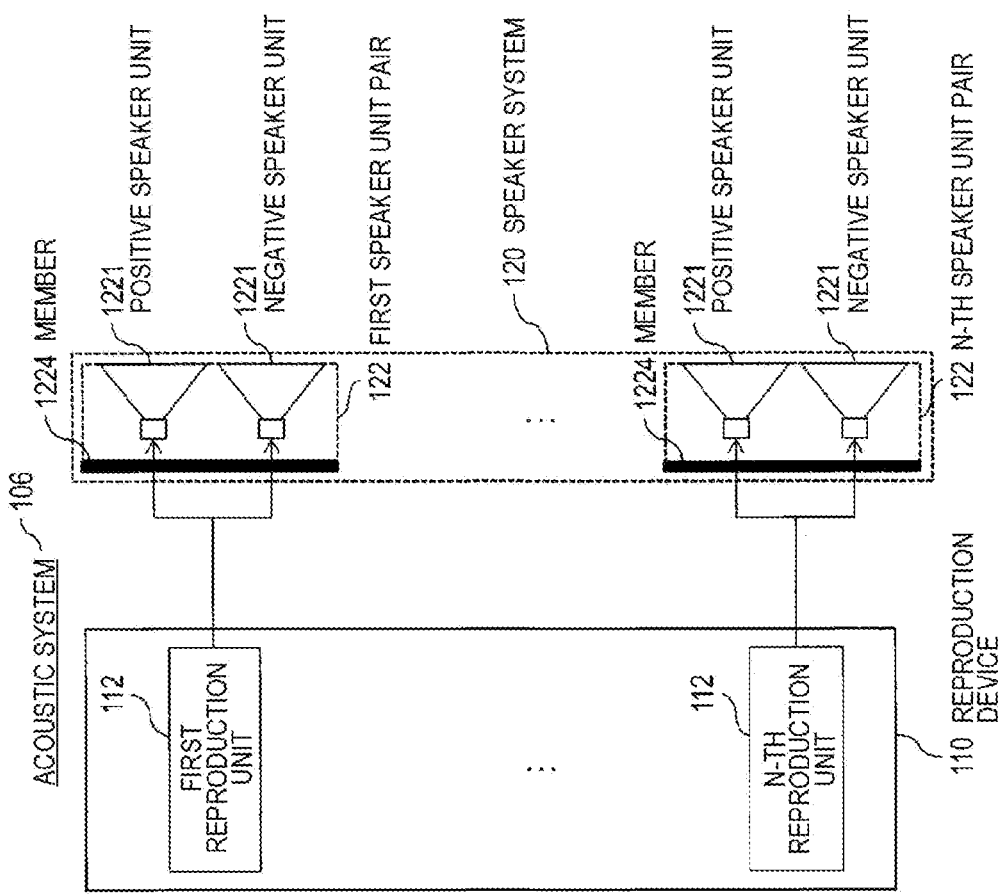
FIG. 20 is a block diagram illustrating an example of a configuration of an acoustic system 106.

Hereinafter, an acoustic system 106 will be described with reference to FIG. 20. FIG. 20 is a block diagram illustrating a configuration of the acoustic system 106. As illustrated in FIG. 20, similarly to the acoustic system 104, the acoustic system 106 includes a reproduction device 110 and a speaker system 120. However, the acoustic system 106 is different from the acoustic system 104 in that the speaker unit 1221 to which the tweeter 1223 is not attached is used instead of the speaker unit 1221 to which the tweeter 1223 is attached, and a member 1224 is attached to the speaker unit pair 122.

Hereinafter, a structure of the n-th speaker unit pair 122 (n=1, ..., N) will be described with reference to FIG. 20.

Figure 21:
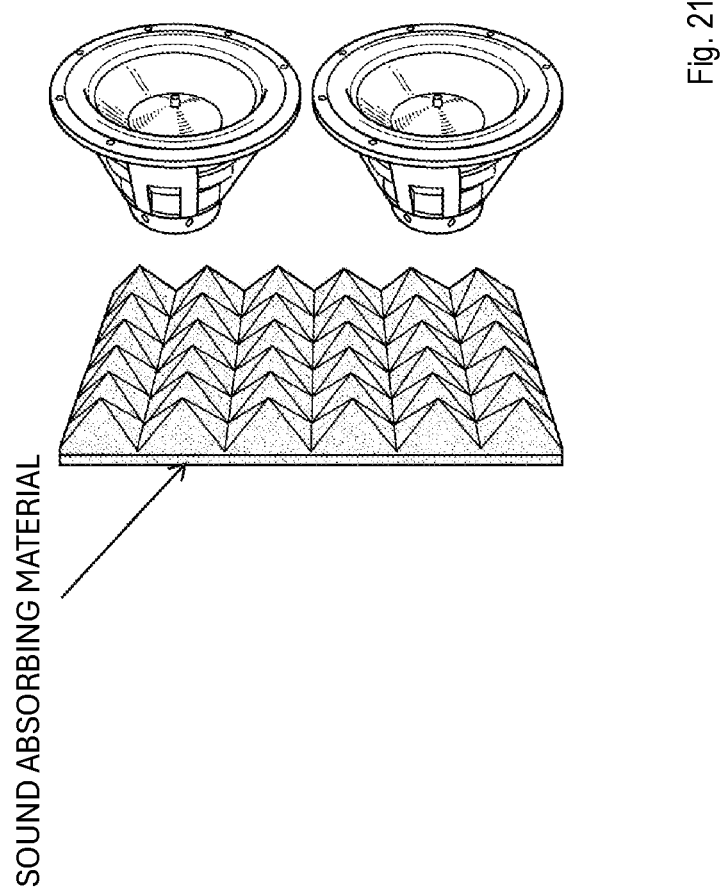
FIG. 21 is a diagram illustrating an example of a configuration of the speaker unit pair 122 to which a member 1224 is attached.

To the n-th speaker unit pair 122, the member 1224 is attached for absorbing a sound emitted in the direction opposite to the n-th user direction from the positive speaker unit 1221 and the negative speaker unit 1221 of the n-th speaker unit pair 122 (see FIG. 21). The member 1224 may be any member as long as a high-frequency sound can be prevented from being emitted from the back. Note that, instead of installing the member 1224 only on the back of the speaker unit pair 122, the member 1224 may be installed to surround other than the front of the speaker unit pair 122.

According to the embodiment of the present invention, it is possible to reproduce a sound that can be heard only in a very limited narrow range that is the vicinity of the speaker system.

Seventh Embodiment

By using the speaker unit 1221 to which the member 1224 is attached, the acoustic system 106 of the sixth embodiment is a system in which a high-frequency sound hardly leaks. Here, a description will be given of an acoustic system in which each speaker unit of a speaker unit pair is housed in a speaker box with a hole instead of using a speaker unit pair to which a sound absorbing material is attached, so that a high-frequency sound hardly leaks.

Figure 22:
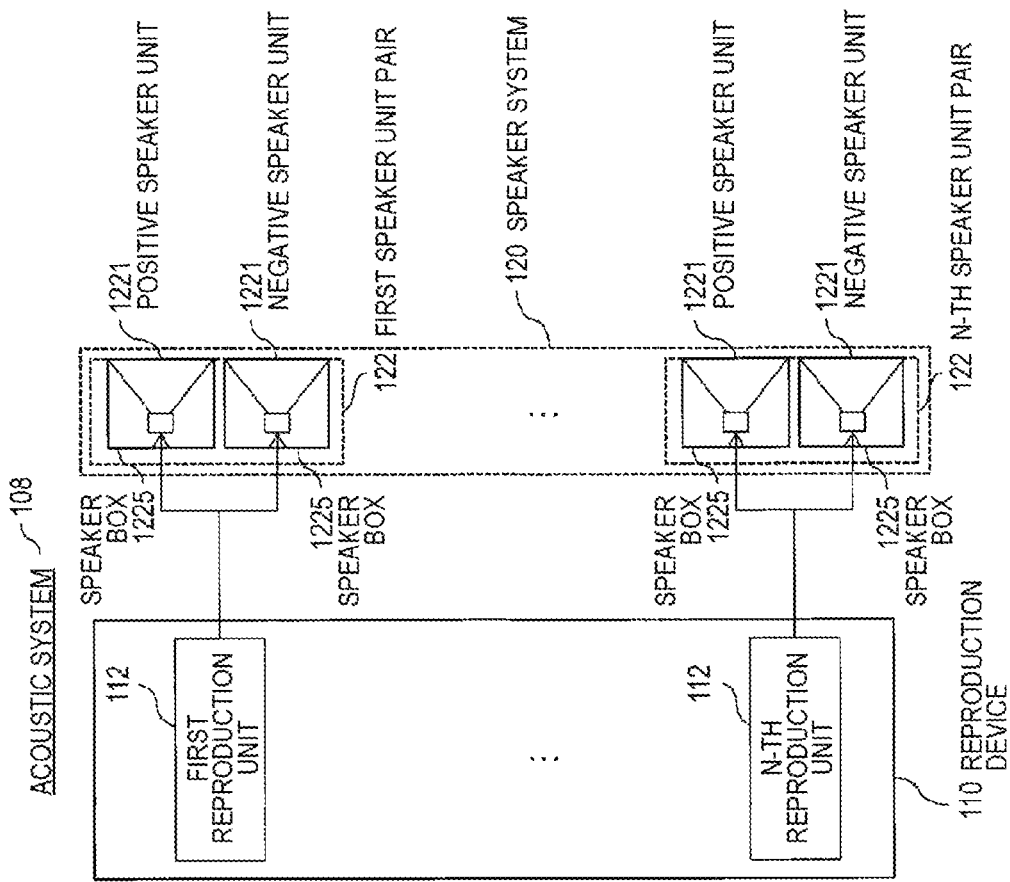
FIG. 22 is a block diagram illustrating an example of a configuration of an acoustic system 108.

Hereinafter, an acoustic system 108 will be described with reference to FIG. 22. FIG. 22 is a block diagram illustrating a configuration of the acoustic system 108. As illustrated in FIG. 22, similarly to the acoustic system 106, the acoustic system 108 includes a reproduction device 110 and a speaker system 120. The acoustic system 108 is different from the acoustic system 106 in that the speaker unit pair 122 including the speaker unit 1221 housed in a speaker box 1225 is included instead of the speaker unit pair 122 to which the member 1224 is attached.

Hereinafter, a structure of the n-th speaker unit pair 122 (n=1, ..., N) will be described with reference to FIG. 22.

The positive speaker unit 1221 and the negative speaker unit 1221 of the n-th speaker unit pair 122 are respectively housed in speaker boxes 1225. Note that each speaker box 1225 has a large number of holes.

According to the embodiment of the present invention, it is possible to reproduce a sound that can be heard only in a very limited narrow range that is the vicinity of the speaker system.

Eighth Embodiment

Differences from the first embodiment will be mainly described.

In the present embodiment, an acoustic system for reproduction is implemented using four speaker units. Note that, as described above, the acoustic system for reproduction performs reproduction so that a sound based on an acoustic signal obtained from a reproduction target can be heard only by a user in the vicinity of the speaker system. In other words, the acoustic system for reproduction emits a sound so that the acoustic signal obtained on the basis of the reproduction target cannot be heard or is hardly heard outside a predetermined range near the user who uses the seat.

Figure 23:
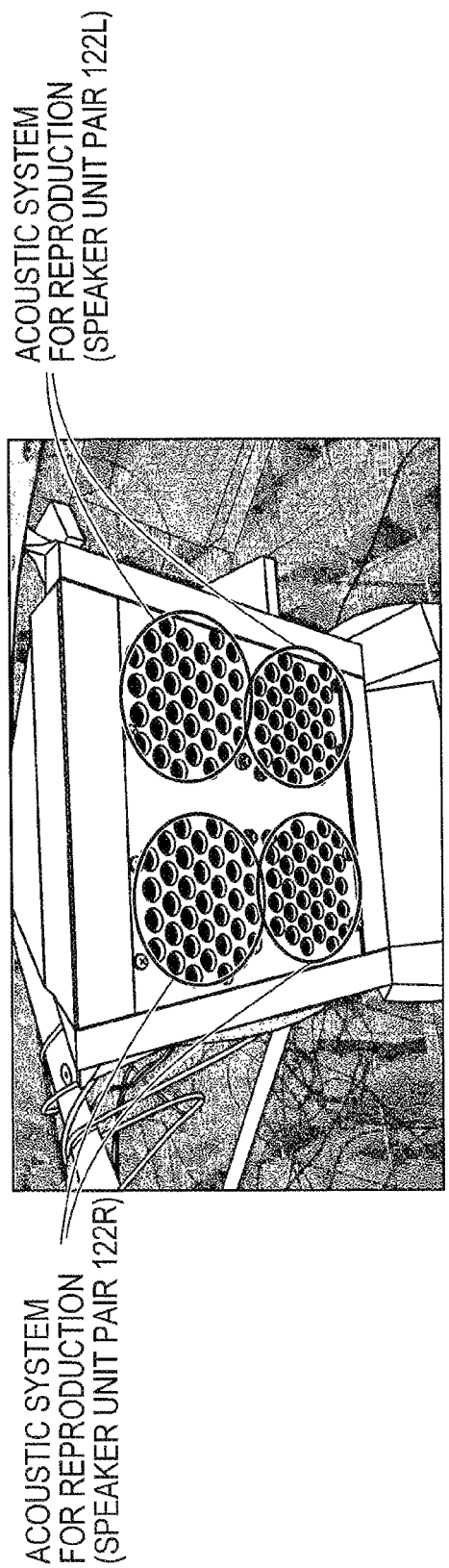
FIG. 23 is a diagram illustrating an example of an acoustic system installed in a flat headrest of a seat of a vehicle.

An example of the acoustic system for reproduction is illustrated in FIG. 23. FIG. 23 is a diagram illustrating an example of an acoustic system installed in a flat headrest of a seat of a vehicle. The speaker system of the acoustic system for reproduction in FIG. 23 is installed in a headrest portion of the seat to be behind the head of the seated user. A speaker unit pair 122R including two speaker units (that is, a positive speaker unit 1221 and a negative speaker unit 1221) is arranged on the right side from the center of the seat with a direction in which the seat faces the user as the front. A speaker unit pair 122L including remaining two speaker units (that is, the positive speaker unit 1221 and the negative speaker unit 1221) is arranged on the left side from the center of the seat with the direction in which the seat faces the user as the front. The positive speaker unit 1221 or the negative speaker unit 1221 included in the speaker unit pair 122R is arranged at a position closer to the right ear of the user seated in the seat as compared with the other speaker unit 1221 included in the speaker unit pair 122R. Similarly, the positive speaker unit 1221 or the negative speaker unit 1221 included in the speaker unit pair 122L is arranged at a position closer to the left ear of the user seated in the seat as compared with the other speaker unit 1221 included in the speaker unit pair 122L.

Figure 24:
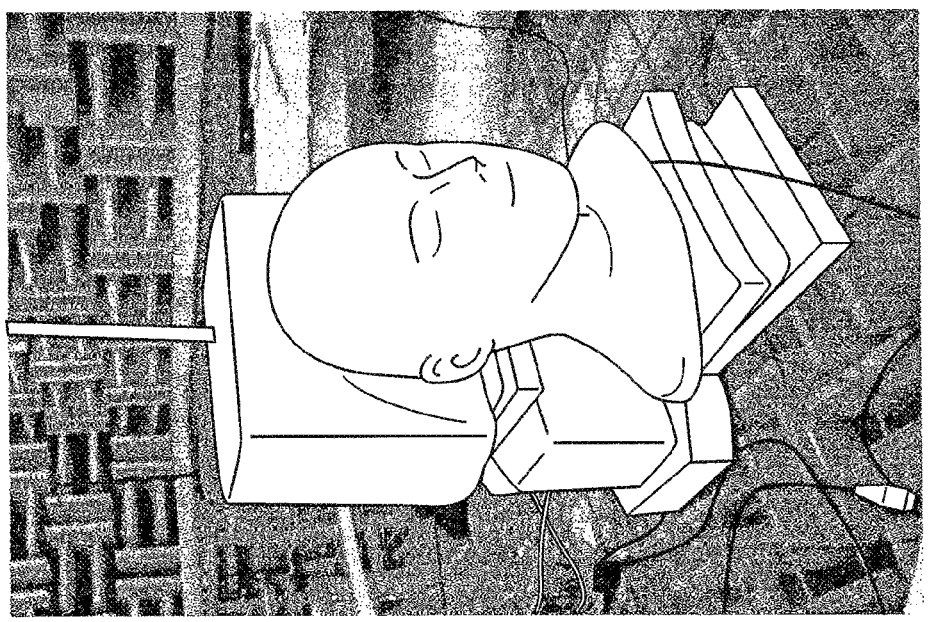
FIG. 24 is a diagram in which a cover is put on a headrest portion where the acoustic system is arranged and a dummy imitating the head of a user is arranged.

FIG. 24 is a diagram in which a cover is put on a headrest portion where the acoustic system for reproduction of FIG. 23 is arranged and a dummy imitating the head of the user is arranged. In this example, since both ears of the user are located at the lower side of the headrest portion, the speaker units on the lower sides of the speaker unit pairs 122R and 122L are arranged at positions close to the right ear and the left ear of the user seated in the seat, respectively.

Note that the acoustic system can also be installed in vehicles other than aircrafts such as automobiles and trains, a reclining chair, and the like, and can also be installed in a wearable form such as being placed on a shoulder. In addition, for the acoustic system for reproduction, a driver unit pair in which two driver units corresponding to the above-described speaker unit pair are arranged may be installed in each of left and right units of headphones and earphones. The headphones are generally roughly classified into two types, an open type (open air type) and a sealed type (closed type), and when the above-described technology is applied particularly to the open type in which there is a concern about sound leakage, the sound leakage is expected to be reduced.

Figure 25:
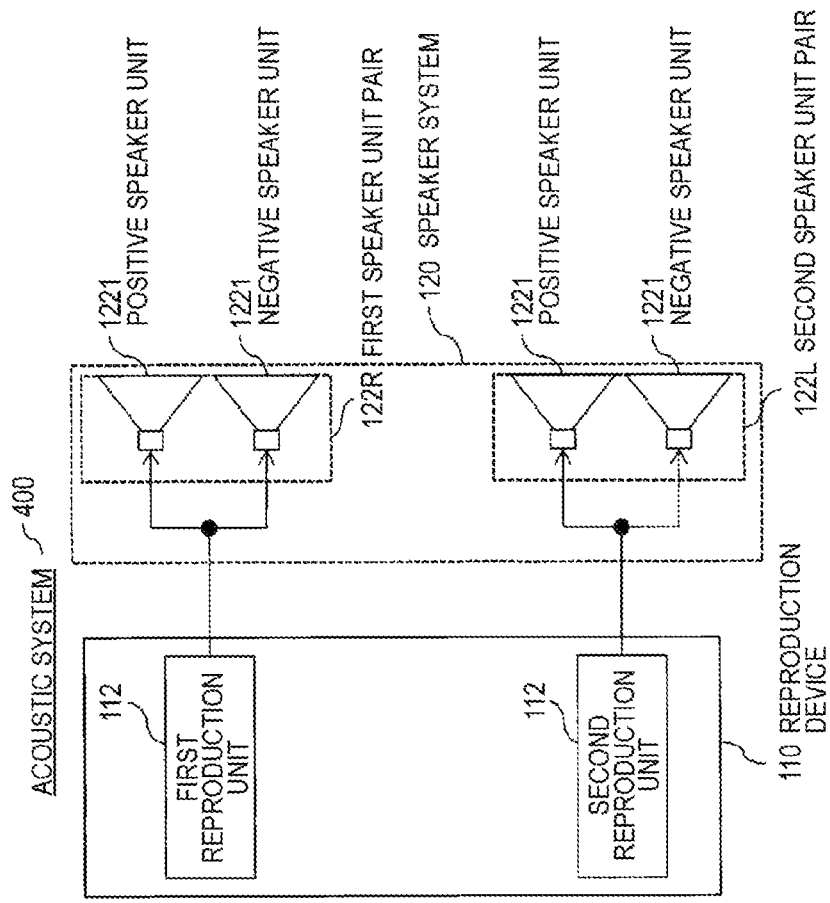
FIG. 25 is a block diagram illustrating an example of a configuration of an acoustic system 400.

FIG. 25 is a block diagram illustrating a configuration of an acoustic system 400. As illustrated in FIG. 25, the acoustic system 400 includes a reproduction device 110 and a speaker system 120. The reproduction device 110 and the speaker system are as described in the first embodiment. However, N representing the number of reproduction units 112 and speaker unit pairs 122 is 2.

Hereinafter, operation of the acoustic system 400 will be described with reference to FIG. 25.

The reproduction device 110 is as described in the first embodiment. However, N=2.

With a first acoustic signal and a third acoustic signal that are acoustic signals obtained on the basis of the reproduction target as inputs, the reproduction device 110 outputs the first acoustic signal, a second acoustic signal, the third acoustic signal, and a fourth acoustic signal. More specifically, an n-th reproduction unit 112 (n=1, 2) generates a 2n-th acoustic signal that is an acoustic signal having a phase opposite to that of a (2n-1)-th acoustic signal from the (2n-1)-th acoustic signal, with the (2n-1)-th acoustic signal as an input, and outputs the (2n-1)-th acoustic signal and the 2n-th acoustic signal. The (2n-1)-th acoustic signal and the 2n-th acoustic signal are input to the positive speaker unit 1221 and the negative speaker unit 1221 of the n-th speaker unit pair 122, respectively. Note that an analog acoustic signal may be converted into an analog acoustic signal having an opposite phase. In addition, the acoustic signals of the reproduction target may be separated, one of the acoustic signals may be output to the positive speaker unit 1221 as it is, and the other of the acoustic signals may be made into an acoustic signal having an opposite phase by using a phase inverter or a matching transformer, and output to the negative speaker unit 1221.

The speaker system 120 emits sounds based on the first to fourth acoustic signals, with the first to fourth acoustic signals output from the reproduction device 110 as inputs. More specifically, the n-th speaker unit pair 122 (n=1, 2) emits a sound based on the (2n-1)-th acoustic signal, from the positive speaker unit 1221, and emits a sound based on the 2n-th acoustic signal, from the negative speaker unit 1221, with the (2n-1)-th acoustic signal and the 2n-th acoustic signal as inputs.

Note that a sound emitted from the positive speaker unit 1221 of the n-th speaker unit pair 122 in the n-th user direction and a sound emitted from the positive speaker unit 1221 of the n-th speaker unit pair 122 in the direction opposite to the n-th user direction are in opposite phase relationship with each other. Similarly, a sound emitted from the negative speaker unit 1221 of the n-th speaker unit pair 122 in the n-th user direction and a sound emitted from the negative speaker unit 1221 of the n-th speaker unit pair 122 in the direction opposite to the n-th user direction are in opposite phase relationship with each other.

The speaker units arranged at positions closer to the right ear and the left ear of the user seated on the seat need to be unified to the positive speaker units or the negative speaker units. As a result, the speaker units arranged at positions farther from the right ear and the left ear of the user seated in the seat are unified to the negative speaker units or the positive speaker units. This is because, in a case where the speaker units arranged at positions closer to the right ear and the left ear of the user seated in the seat are not unified to the positive speaker units or the negative speaker units, a localization feeling different from an intended localization feeling is given to the user, and a sense of discomfort occurs.

With such a configuration, since the (2n-1)-th acoustic signal is in opposite phase relationship with the 2n-th acoustic signal, the sounds based on the (2n-1)-th acoustic signal and the 2n-th acoustic signal are heard only in the vicinity of the seat where the speaker system 120 is installed, and nearby area reproduction is achieved. For example, when the first acoustic signal and the third acoustic signal are respectively an acoustic signal of a right channel and an acoustic signal of a left channel of a certain sound source, a stereo sound can be heard only in the vicinity of the seat where the speaker system 120 is installed.

Note that, in the present embodiment, the number of speakers is the same between the right ear speaker unit and the left ear speaker unit; however, the embodiment may be implemented with different numbers of speakers. In short, it is sufficient the speaker unit for the right ear and the speaker unit for the left ear may be arranged so that disturbance of phases and cancellation due to diffraction do not occur near the right ear and left ear of the user, and at a distance from the right ear and left ear of the user, the phases are reversed and cancellation occurs independently for the right ear and the left ear.

Figure 26:
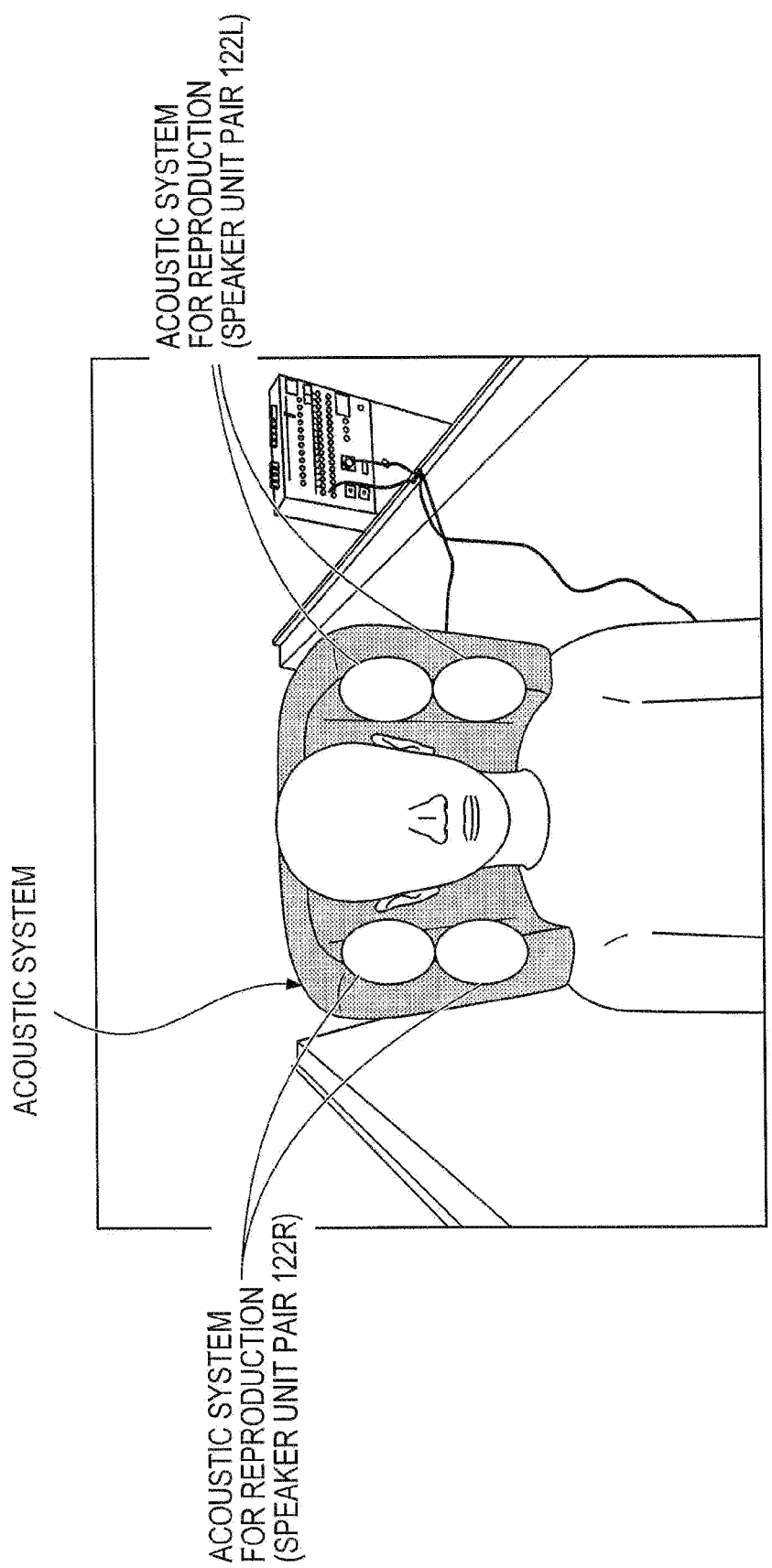
FIG. 26 is a diagram illustrating an example of the acoustic system installed in the seat of the aircraft.

In addition, the acoustic system of the present embodiment may be applied not only to the flat headrest of the seat of the vehicle but also to an acoustic system installed on the seat to sandwich the head of the seated user. FIG. 26 is a diagram illustrating an example of the acoustic system of the present embodiment installed in the seat of the aircraft. The acoustic system in FIG. 26 is installed on the seat to sandwich the head of the seated user, and two speaker unit pairs are arranged to be near the left and right ears. Note that such an acoustic system can also be installed in vehicles other than aircrafts such as automobiles and trains, a reclining chair, and the like, and can also be installed in a wearable form such as being placed on a shoulder. In addition, a driver unit pair in which two driver units corresponding to the above-described speaker unit pair are arranged may be installed in each of left and right units of headphones and earphones. The headphones are generally roughly classified into two types, an open type (open air type) and a sealed type (closed type), and when the above-described technology is applied particularly to the open type in which there is a concern about sound leakage, the sound leakage is expected to be reduced.

In the case of FIG. 26, the speaker units on the upper side are speaker units arranged at positions closer to the right ear and the left ear of the user seated on the seat, and are unified to the positive speaker units or the negative speaker units.

Ninth Embodiment

Differences from the eighth embodiment will be mainly described.

As described in the third embodiment, since the high-frequency sound has a short wavelength, it is difficult to make phases of the sound coming around from the back and the sound from the front the same. For that reason, the high-frequency sound has a characteristic of being less likely to be erased in the vicinity of the speaker unit and in a relatively distant place other than the vicinity as compared with the low-frequency sound.

In the present embodiment, a description will be given of an acoustic system having a structure in which the high-frequency sound is less likely to leak out of the vicinity of the speaker system.

Figure 27:
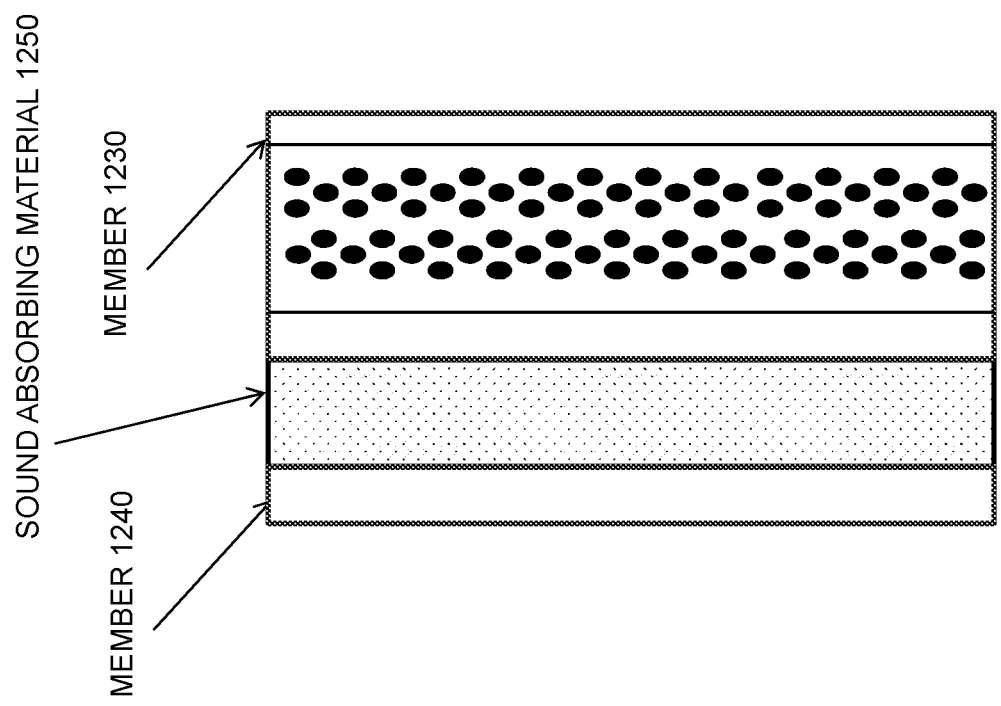
FIG. 27 is a diagram illustrating an example of a configuration of the speaker unit pair 122 to which members 1230 and 1240 and a sound absorbing material 1250 are attached.

The embodiment is different from the eighth embodiment in that a member 1230, a member 1240, and a sound absorbing material 1250 are attached to a speaker unit pair 122 (see FIG. 27).

The member 1230 and the member 1240 sandwich the speaker unit pair 122 respectively from the front and the back. Further, the member 1230 and the member 1240 sandwich the sound absorbing material 1250 at an edge of a surface sandwiching the speaker unit pair 122. In other words, the member 1230 and the member 1240 sandwich the sound absorbing material 1250 on a side surface of a space sandwiched between the member 1230 and the member 1240. The member 1230 and the member 1240 each may be a member such as a partition plate of the second embodiment. The member 1230 that sandwiches the speaker unit pair 122 from the front is provided with a hole so that sound passes through, and the speaker unit pair 122 that sandwiches the member 1240 from the back is not provided with a hole so that sound does not come out. The sound absorbing material 1250 is a member that has a higher sound absorbing effect at higher frequencies and in which sound is not absorbed at lower frequencies.

With such a configuration, the high-frequency sound having high straightness passes through the hole of the member 1230 and is emitted only to the ear. Since the sound absorbing material 1250 and the member 1240 prevent diffusion of the high-frequency sound, the high-frequency sound is not emitted to the side and back of the speaker unit pair 122. Since the low-frequency sound has high diffusibility, the low-frequency sound comes around to the back even if there is no hole in the member 1230. Regardless of whether or not there is a hole in the member 1230, low-frequency sounds pass through the sound absorbing material 1250, come around to the back, and cancel each other to be erased at a place other than the vicinity.

With such a configuration, according to the embodiment of the present invention, it is possible to reproduce a sound that can be heard only in a very limited narrow range that is the vicinity of the speaker system.

Tenth Embodiment

Differences from the eighth embodiment will be mainly described.

In the present embodiment, a combination with an acoustic system for reproduction is implemented using three speaker units.

Figure 28:
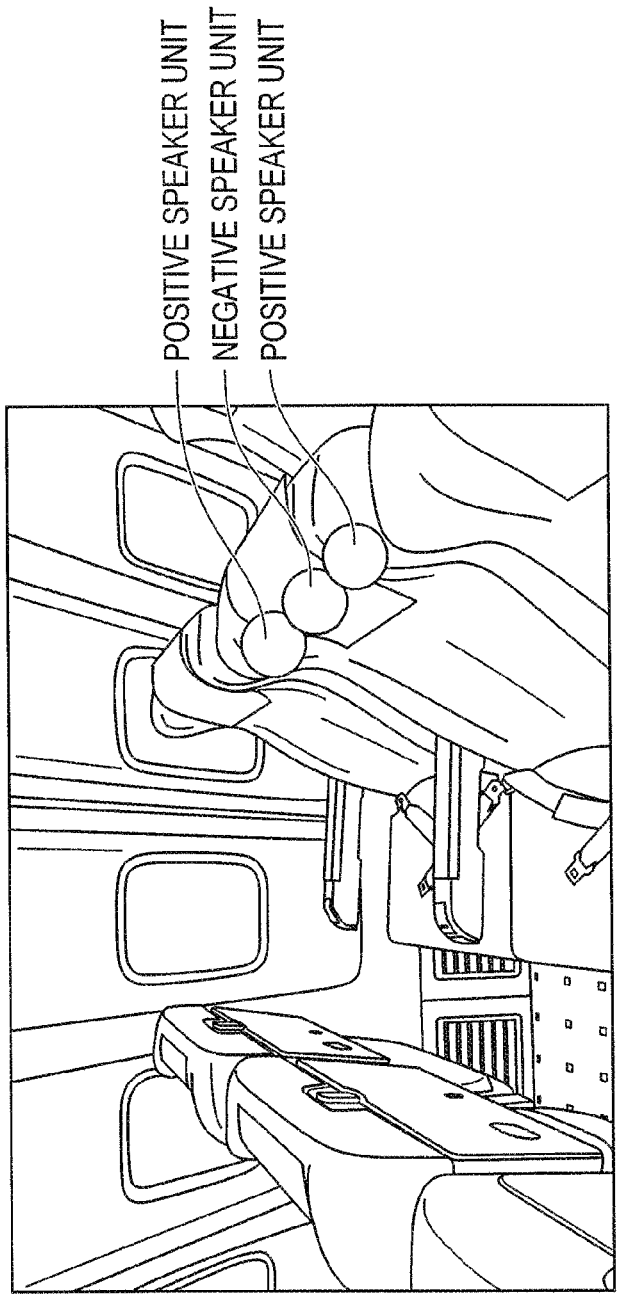
FIG. 28 is a diagram illustrating an example of the acoustic system installed in the flat headrest of the seat of the vehicle.

FIG. 28 illustrates an arrangement example of the speaker units in the acoustic system for reproduction. FIG. 28 is a diagram illustrating an example of the acoustic system installed in the flat headrest such as a seat of a bullet train. The speaker system of the acoustic system for reproduction in FIG. 28 is installed in a headrest portion of the seat to be behind the head of a seated user. A positive speaker unit 1221 of a speaker unit pair 122R including two speaker units (that is, a positive speaker unit 1221 and a negative speaker unit 1221) is arranged on the right side from the center of the seat with a direction in which the seat faces the user as the front. The negative speaker unit 1221 of the speaker unit pair 122R is arranged at the center of the seat. Note that, the negative speaker unit 1221 arranged at the center of the seat is shared with a speaker unit pair 122L. Remaining one speaker unit is arranged on the left side from the center of the seat with the direction in which the seat faces the user as the front, and constitutes the speaker unit pair 122L together with the negative speaker unit 1221 of the speaker unit pair 122R described above. The positive speaker units 1221 of the speaker unit pair 122R and the speaker unit pair 122L are respectively arranged at positions closer to the right ear and the left ear of the user seated in the seat as compared with the negative speaker unit 1221.

An acoustic system 420 that is the acoustic system for reproduction will be described with reference to FIG. 29.

As illustrated in FIG. 29, the acoustic system 420 includes a reproduction device 110 and a speaker system 120. The reproduction device 110 is as described in the eighth embodiment. The speaker system 120 includes N speaker unit pairs 122 described in the first embodiment, and further includes one addition unit 621. However, N=2, and the two speaker unit pairs 122 are the first speaker unit pair 122 and the second speaker unit pair 122. The n-th speaker unit pair 122 (n=1, 2) includes two speaker units (that is, the positive speaker unit 1221 and the negative speaker unit 1221), and shares the negative speaker unit 1221 with each other.

With an acoustic signal having a phase opposite to that of an acoustic signal input to the positive speaker unit 1221 of the first speaker unit pair 122 and an acoustic signal having a phase opposite to that of an acoustic signal input to the positive speaker unit 1221 of the second speaker unit pair 122 as inputs, the addition unit 621 adds the two input acoustic signals together, and outputs the added acoustic signal to the negative speaker unit 1221.

In addition, the positive speaker unit 1221 and the negative speaker unit 1221 of the n-th speaker unit pair 122 (n=1, 2) are arranged in a positional relationship in which a sound emitted from the positive speaker unit 1221 and a sound emitted from the negative speaker unit 1221 are mutually erased so that the sounds cannot be heard by a user who uses another seat.

Hereinafter, operation of the acoustic system 420 will be described with reference to FIG. 29.

With a first acoustic signal and a third acoustic signal that are acoustic signals obtained on the basis of the reproduction target as inputs, the reproduction device 110 outputs the first acoustic signal, a second acoustic signal, the third acoustic signal, and a fourth acoustic signal. More specifically, an n-th reproduction unit 112 (n=1, 2) generates a 2n-th acoustic signal that is an acoustic signal having a phase opposite to that of a (2n-1)-th acoustic signal from the (2n-1)-th acoustic signal, with the (2n-1)-th acoustic signal as an input, and outputs the (2n-1)-th acoustic signal and the 2n-th acoustic signal. The (2n-1)-th acoustic signal and the 2n-th acoustic signal are input to the positive speaker unit 1221 and the addition unit 621, respectively.

With two 2n-th acoustic signals (n=1, 2) as inputs, the addition unit 621 adds the two acoustic signals together, and outputs the added acoustic signal to the negative speaker unit 1221. Note that the added acoustic signal is also referred to as a mixed acoustic signal.

The speaker system 120 emits a sound based on the first acoustic signal, a sound based on the third acoustic signal, and a sound based on the mixed acoustic signal, with the first acoustic signal, the third acoustic signal, and the mixed acoustic signal output from the addition unit 621 as inputs. More specifically, the n-th speaker unit pair 122 (n=1, 2) emits a sound based on the (2n-1)-th acoustic signal, from the positive speaker unit 1221 of the n-th speaker unit pair 122, and emits a sound based on the mixed acoustic signal, from the negative speaker unit 1221, with the (2n-1)-th acoustic signal and the mixed acoustic signal as inputs.

Note that a sound emitted from the positive speaker unit 1221 of the n-th speaker unit pair 122 in the n-th user direction and a sound emitted from the positive speaker unit 1221 of the n-th speaker unit pair 122 in the direction opposite to the n-th user direction are in opposite phase relationship with each other. Similarly, a sound emitted from the negative speaker unit 1221 of the n-th speaker unit pair 122 in the n-th user direction and a sound emitted from the negative speaker unit 1221 of the n-th speaker unit pair 122 in the direction opposite to the n-th user direction are in opposite phase relationship with each other.

With such a configuration, since the (2n-1)-th acoustic signal is in opposite phase relationship with the 2n-th acoustic signal included in the mixed acoustic signal, the sounds based on the (2n-1)-th acoustic signal and the 2n-th acoustic signal are heard only in the vicinity of the seat where the speaker system 120 is installed, and nearby area reproduction is achieved.

<Supplement>

The description of the embodiments of the present invention described above has been presented for purposes of illustration and description. There is no intention to be exhaustive or to limit the invention to the precise form disclosed. Modifications and variations are possible from the above teaching. The embodiments have been chosen and represented to provide the best illustration of the principles of the present invention, and to enable others skilled in the art to utilize the present invention in various embodiments and with added variations to suit contemplated practical use. All such modifications and variations are within the scope of the present invention as defined by the appended claims interpreted in accordance with a fairly and legally equitable breadth.

The invention claimed is:

1. A speaker system that emits, by using at least four speaker units arranged in a seat of a vehicle, acoustic signals obtained on a basis of a reproduction target such that the acoustic signals are not able to be heard or hardly heard outside a predetermined range near a user who uses the seat, wherein at least two speaker units of the at least four speaker units are arranged on a right side from a center of the seat, at least two speaker units of the at least four speaker units are arranged on a left side from the center of the seat, a (2R-1)-th speaker unit that is one of the at least two speaker units arranged on the right side is arranged at a position closer to a right ear of the user seated on the seat as compared with a 2R-th speaker unit that is another one of the at least two speaker units arranged on the right side, a (2L-1)-th speaker unit that is one of the at least two speaker units arranged on the left side is arranged at a position closer to a left ear of the user seated on the seat as compared with a 2L-th speaker unit that is another one of the at least two speaker units arranged on the left side, the acoustic signals obtained on the basis of the reproduction target are emitted from the (2R-1)-th speaker unit and the 2R-th speaker unit to be opposite in phase to each other, the acoustic signals obtained on the basis of the reproduction target are emitted from the (2L-1)-th speaker unit and the 2L-th speaker unit to be opposite in phase to each other, and the acoustic signals are emitted from the (2R-1)-th speaker unit and the (2L-1)-th speaker unit not to be opposite in phase to each other, and at least one of the speaker units is arranged toward a direction in which the user is seated in the seat.

2. A speaker system that emits, by using at least four speaker units arranged in a seat of a vehicle, acoustic signals obtained on a basis of a reproduction target such that the acoustic signals are not able to be heard or hardly heard outside a predetermined range near a user who uses the seat, wherein

- a (2R-1)-th speaker unit and a 2R-th speaker unit that are two speaker units of the at least four speaker units are arranged on a right side from a center of the seat,
- a (2L-1)-th speaker unit and a 2L-th speaker unit that are two speaker units of the at least four speaker units are arranged on the right side from the center of the seat,
- the (2R-1)-th speaker unit emits a (2R-1)-th acoustic signal that is one of the acoustic signals obtained on the basis of the reproduction target,
- the 2R-th speaker unit emits a 2R-th acoustic signal that is an acoustic signal having a phase opposite to that of the (2R-1)-th acoustic signal,
- the (2L-1)-th speaker unit emits a (2L-1)-th acoustic signal that is one of the acoustic signals obtained on the basis of the reproduction target,
- the 2L-th speaker unit emits a 2L-th acoustic signal that is an acoustic signal having a phase opposite to that of the (2L-1)-th acoustic signal, and
- the (2R-1)-th speaker unit and the (2L-1)-th speaker unit are arranged closer to a right ear and a left ear of the user who uses the seat than the 2R-th speaker unit and the 2L-th speaker unit, respectively, or
- the 2R-th speaker unit and the 2L-th speaker unit are arranged closer to the right ear and the left ear of the user who uses the seat than the (2R-1)-th speaker unit and the (2L-1)-th speaker unit, respectively, and
- at least one of the speaker units is arranged toward a direction in which the user is seated in the seat.

3. A speaker system that emits a sound based on a first acoustic signal, . . . , and a sound based on a (2N-1)-th acoustic signal such that the sounds are able to be heard only in a vicinity, where N is any integer greater than or equal to 2 and a (2n-1)-th acoustic signal (n=1, . . . , N) is an acoustic signal obtained on a basis of a reproduction target, the speaker system comprising an n-th speaker unit pair (n=1, . . . , N) including a speaker unit (hereinafter, referred to as a positive speaker unit) that emits a sound based on the (2n-1)-th acoustic signal and a speaker unit (hereinafter, referred to as a negative speaker unit) that emits a sound based on a 2n-th acoustic signal that is an acoustic signal having a phase opposite to that of the (2n-1)-th acoustic signal, wherein an R-th speaker unit pair is arranged on a right side from a center of the seat, where R is any of 1, . . . , and N, an L-th speaker unit pair is arranged on a left side from the center of the seat, where L is any of 1, . . . , and N, and R≠L, the (2R-1)-th speaker unit and the (2L-1)-th speaker unit are arranged closer to a right ear and a left ear of a user who uses the seat than the 2R-th speaker unit and the 2L-th speaker unit, respectively, or the 2R-th speaker unit and the 2L-th speaker unit are arranged closer to the right ear and the left ear of the user who uses the seat than the (2R-1)-th speaker unit and the (2L-1)-th speaker unit, respectively, and at least one of the speaker units is arranged toward a direction in which the user is seated in the seat.

4. The speaker system according to claim 3, wherein a direction in which the n-th speaker unit pair faces the user is defined as an n-th user direction (n=1, . . . , N), the n-th speaker unit pair is sandwiched between two members in the n-th user direction and a direction opposite to the n-th user direction, and the two members sandwich a sound absorbing material on a side surface of a space sandwiched between the two members, and one of the members in the n-th user direction is provided with a hole such that sound passes through, one of the members in the direction opposite to the n-th user direction is not provided with a hole such that sound does not come out, and the sound absorbing material is a member that has a higher sound absorbing effect at a higher frequency and is absorbed less at a lower frequency.

* * * * *